United States Patent [19]

Pinkerton et al.

[11] Patent Number: 5,525,848
[45] Date of Patent: Jun. 11, 1996

[54] MAGNETIC BEARING SYSTEM INCLUDING A GENERATOR

[75] Inventors: Joseph F. Pinkerton, Austin; David B. Clifton, Leander, both of Tex.

[73] Assignee: Magnetic Bearing Technologies, Inc., Austin, Tex.

[21] Appl. No.: 225,998

[22] Filed: Apr. 12, 1994

Related U.S. Application Data

[63] Continuation-in-part of Ser. No. 996,192, Dec. 23, 1992, Pat. No. 5,302,874, which is a continuation-in-part of Ser. No. 950,607, Sep. 25, 1992, abandoned.

[51] Int. Cl.[6] .............................. H02K 5/16; H02K 7/08
[52] U.S. Cl. .............................. 310/90; 310/68; 310/113
[58] Field of Search .............................. 310/90.5, 90, 68, 310/113, 114, 254, 261

[56] References Cited

U.S. PATENT DOCUMENTS

| | | | |
|---|---|---|---|
| 4,389,849 | 6/1983 | Gasser et al. | 62/6 |
| 4,976,177 | 12/1990 | Fouche | 82/147 |
| 5,053,662 | 10/1991 | Richter | 310/90.5 |
| 5,142,175 | 8/1992 | Watanabe | 310/90.5 |
| 5,313,399 | 5/1994 | Beale | 364/463 |
| 5,347,191 | 9/1994 | Wood | 310/113 |

FOREIGN PATENT DOCUMENTS

| | | | |
|---|---|---|---|
| 5065919 | 3/1993 | Japan . | |

*Primary Examiner*—Steven L. Stephan
*Assistant Examiner*—Elvin Enad
*Attorney, Agent, or Firm*—Beveridge, DeGrandi, Weilacher & Young

[57] ABSTRACT

A magnetic bearing system has a magnetic bearing and an electric generator for activating the magnetic bearing. The various components of the system are mounted respectively on a rotor and a stator. The magnetic bearing is of the magnetic attraction type or of the Lorentz force type. It has first and second subassemblies, one of which is on the rotor and the other of which is on the stator. The generator has at least one magnet subassembly and at least one loop subassembly, one of which is on the rotor and the other of which is on the stator. The magnet subassembly has field magnets for creating magnetic fields. The loop subassembly has loops which travel through the magnetic fields. The magnetic fields are positioned where (a) they subject the interior of a loop moving therethrough to magnetic flux which produces equal and opposed electromotive forces in the loop when the loop is on a prescribed circular path, and (b) they subject the loop's interior to flux which produces unequal and opposed electromotive forces in the loop when the loop deviates from its prescribed circular path. The latter induces, in the generator loop, an electric current which is proportional to the displacement of the loop from its prescribed path. The generator loop is electrically connected to a coil in the bearing so that the generator activates the bearing whenever the generator loop deviates from its prescribed circular path.

30 Claims, 14 Drawing Sheets

MAGNETIC BEARING SYSTEM INCLUDING A GENERATOR

REFERENCE TO RELATED APPLICATIONS

This is a continuation-in-part of patent application Ser. No. 07/996,192 filed Dec. 23, 1992, (now U.S. Pat. No. 5,302,874) which, in turn, was a continuation-in-part of patent application Ser. No. 07/950,607 filed Sep. 25, 1992, now abandoned.

BACKGROUND OF THE INVENTION

The original passive magnetic bearing, developed by one of the inventors of the present invention and fully described in U.S. Pat. No. 5,302,874, has several advantages over conventional magnetic bearings. The passive magnetic bearing eliminates the need for position sensors, control electronics, and high-power amplifiers. It provides a bearing which is much simpler and less expensive than competing conventional bearings. However, the passive magnetic bearing provides relatively less stiffness when compared to conventional magnetic bearings.

To address this obstacle, the inventor of the passive magnetic bearing has combined the passive magnetic bearings with active components to create a semiactive bearing, which is also fully described in U.S. Pat. No. 5,302,874. While the semiactive magnetic bearing possesses load capacity and stiffness characteristics which are similar to those of conventional active magnetic bearings, the semiactive bearings achieve these characteristics by using expensive and complicated sensors, amplifiers and control systems.

SUMMARY OF THE INVENTION

It is therefore an object of the invention to provide a magnetic bearing system which includes the advantages of the passive, active, and semiactive magnetic bearings, while eliminating their respective weaknesses.

A magnetic bearing system according to the invention has a stator assembly and a rotor assembly. The rotor assembly is rotatable relative to the stator assembly. One major component of the system is the magnetic bearing itself. It has a first subassembly and a second subassembly, one of which is on the stator assembly and the other of which is on the rotor assembly. Another major component is an electric generator. It has a magnet subassembly and a loop subassembly. One of these subassemblies is on the stator assembly, and the other is on the rotor assembly.

The loop subassembly includes a loop of electrically conductive material. The magnet subassembly of the electric generator includes a plurality of field magnets which each produce at least one magnetic field, the stator assembly and the rotor assembly are relatively positioned and rotatable about an axis of rotation so that the loop travels along a prescribed circular path relative to and through the magnetic fields produced by the field magnets. These fields produced are positioned (a) to subject the interior of the loop to magnetic flux to produce equal and opposed electromotive forces in the loop when the loop is on its prescribed circular path so that no electrical current flows in the loop, and (b) to subject the interior of the loop to magnetic flux to produce unequal and opposed electromotive forces in the loop when the loop deviates from its prescribed circular path so that an electrical current is induced in the loop. The first subassembly of the magnetic bearing has coils formed of electrical conductors, and the loop of the electric generator is electrically connected to at least one of the coils so that current induced in the loop will activate the magnetic bearing.

According to some embodiments of the invention, the magnetic bearing utilizes magnetic attraction forces for positioning the rotor assembly relative to the stator assembly. The first subassembly includes first and second electromagnets, the second subassembly includes a body which is magnetically attractable by the electromagnets, and the coils are electromagnet windings.

According to other embodiments, the magnetic bearing utilizes Lorentz forces for positioning the rotor assembly relative to the stator assembly. In this case, the coils of the first subassembly are a plurality of bearing loops, the second subassembly has a plurality of bearing field magnets which each produce at least one magnetic field, and the bearing loops move along a prescribed circular path relative to and through the magnetic fields produced by the bearing field magnets.

Either the magnet subassembly or the loop subassembly can be a displaceable subassembly which is movably mounted on its respective assembly. The displaceable subassembly has a normal position which it occupies when the loop is traveling in its prescribed circular path, and it is movable on its respective assembly in only one direction from its normal position. The one direction is lateral with respect to the prescribed circular path. A displaceable subassembly can be supported by a flexible member on one assembly which includes a stop surface which obstructs movement of the displaceable subassembly in a direction which is opposite to the one direction. The flexible member can be made of resilient sheet material. When a bearing system has two electric generators which each have a displaceable subassembly, these displaceable subassemblies can have opposite directions of movement. Current can be transmitted from the loop to the coil.

Bearing systems according to the invention can have a signal generator for generating first electrical signals in synchronism with rotation of the rotor, and a first controller operable in response to the electrical signals for controlling the flow of current from the electric generator to the coil of the first subassembly of the magnetic bearing. A suitable signal generator includes a magnet mount subassembly on the stator or rotor assembly, and a conductor subassembly which is on the other one of these assemblies. The magnet mount assembly can include a plurality of magnet poles equally spaced about its respective assembly in a circumferential direction. The loop subassembly can include a plurality of loops equally spaced about its respective assembly in a circumferential direction. The number of loops is twice the number of the plurality of magnetic poles.

The coils may include a first coil for activating the first assembly to apply force to the stator assembly from the rotor assembly in a first direction, and a second coil for activating the first assembly to apply force to the stator assembly from the rotor assembly in a second direction. The first controller includes a first rectifier and a second rectifier, whereby current is transmitted from the loop to the first coil through the first rectifier, and to the second coil through the second rectifier. The first rectifier is a controlled rectifier which is activated in response to the first electrical signals, and the signal generator generates second electrical signals which are shifted out of phase from the first electrical signals, preferably 180 electrical degrees out of phase from the first electrical signals. The second rectifier is a controlled rectifier which is activated in response to the second electrical signals.

The signal generator can include a magnetic pole subassembly and a conductor subassembly. One of these subassemblies of the signal generator is on the stator assembly, and the other of these subassemblies is on the rotor assembly. The magnet mount subassembly includes a plurality of magnetic poles equally spaced about its respective assembly in a circumferential direction. The conductor subassembly includes a first conductive winding and a second conductive winding, and the second conductive winding is circumferentially displaced on the conductor subassembly from the first conductive winding. The displacement can be 45°.

DETAILED DESCRIPTION OF EMBODIMENTS OF THE INVENTION

Figure 1:
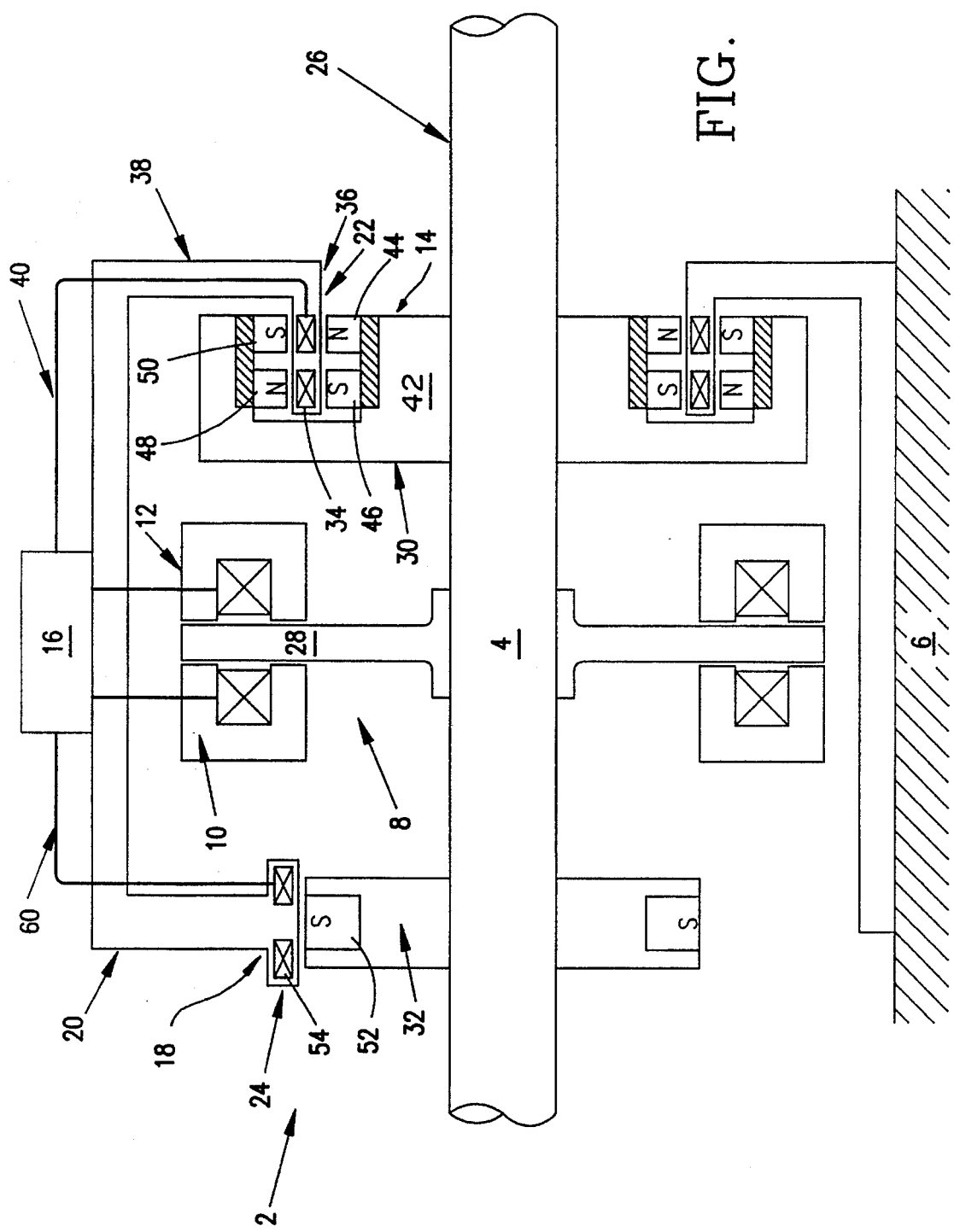
FIG. 1 is a cross-sectional view of an axial magnetic bearing according to one embodiment of the invention.
Figure 2:
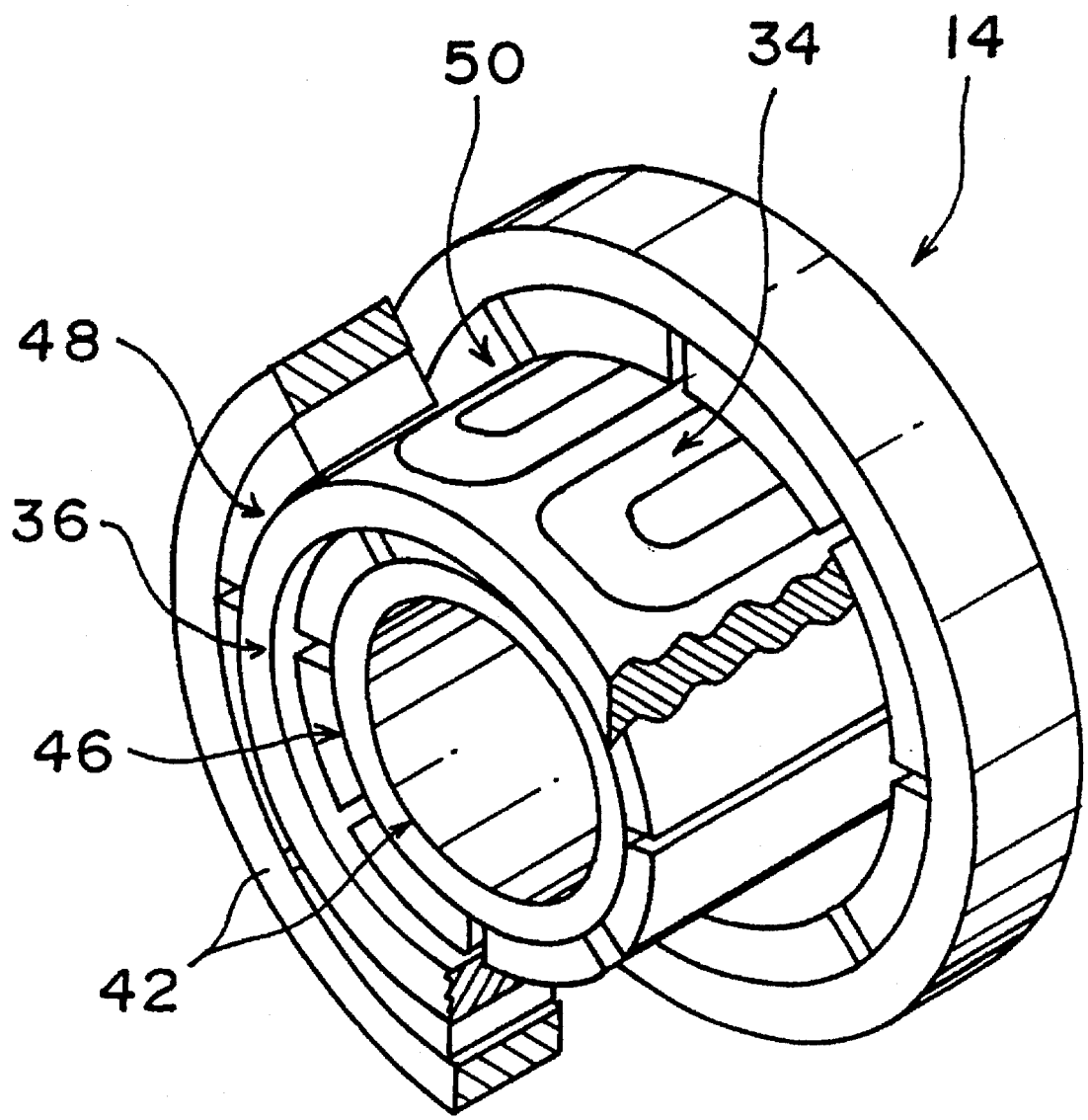
FIG. 2 is a side elevated cutaway view of the embodiment shown in FIG. 1.

The bearing system 2 shown in FIGS. 1 and 2 provides axial support for a rotatable shaft 4 on a stationary support surface 6. Whenever the position of the shaft deviates in an axial direction from a prescribed position, the bearing system 2 will produce corrective forces which restore the shaft to the prescribed position.

The bearing system includes a magnetic bearing 8 which has electromagnets 10, 12 for exerting the restorative force on the shaft, an electric generator 14 which creates the current for activating the bearing 8, and a controller 16 which operates in response to signals from a signal generator 18 to apply voltage from the generator 14 to the electromagnets 10, 12.

The stationary components of the apparatus, i.e. the stator assembly 20, include a loop subassembly 22 of the generator 14, an electromagnet subassembly 10, 12 of the bearing 8, a controller 16, and a pickup coil subassembly 24 of the signal generator 18. The rotating components which constitute the rotor assembly 26 are the shaft 4, a disc subassembly 28 of the magnetic bearing 8, a magnet subassembly 30 of the electric generator 14, and a magnet mounting subassembly 32 of the signal generator 18.

The generator of this embodiment and the other embodiments of the invention discussed later is a displacement-responsive generator. The displacement-responsive generator of the invention produces almost zero AC voltage when its rotor is aligned with its stator. Also, when the rotor is displaced in either its positive or negative direction relative to the stator, the displacement-responsive generator generates AC voltage which is linearly proportional to the amount of displacement.

Further, when the rotor is displaced in its positive direction relative to the stator, the displacement causes the generator to produce a positive voltage at a particular shaft angle. When the rotor is displaced in its negative direction relative to the stator, the displacement causes the generator to produce a negative voltage at the same shaft angle. The result is an AC voltage which is 180 electrical degrees out of phase with the AC voltage produced by displacement in the positive direction.

Discussing the individual components of this embodiment of the invention in more detail, the electrical generator 14 shown in FIGS. 1 and 2 is a passive magnetic bearing displacement-responsive generator. Passive magnetic bearings are disclosed in more detail in U.S. Pat. No. 5,302,874, which is incorporated entirely herein by reference. It includes the stationary loop subassembly 22 and the rotating magnet subassembly 30.

The loop subassembly 22 includes eight loops or coils 34 mounted on a stationary cylinder 36, equally spaced around its circumference. The cylinder 36 is nonmagnetic and nonconductive, and it is supported by one or more fixed members 38. The loops 34 are electrically connected in series to each other and to an output conductor set 40, but they may be connected in parallel.

The magnet subassembly 30 includes a housing 42 which is rotationally and axially fixed to the shaft 4. Four rings of permanent field magnets 44, 46, 48, and 50 are mounted in the housing. For purposes of this explanation, it will be understood that all magnets in any ring are identified by the same reference numeral as shown in FIGS. 1 and 2. As seen in FIG. 2, each ring has eight circumferentially spaced magnets, and each magnet has a pole which faces in the radial direction.

The poles of magnets 44 face radially outwardly, and they are radially aligned with inwardly facing poles of opposite polarities of magnets 50. These two magnet rings provide eight radial magnetic fields to which the loops are exposed.

The direction of the flux lines in these fields alternate successively around the circumference of the magnet subassembly 30. When the rotor turns, the magnets of the magnet assembly travel in a circular path so that their respective fields move relative to the loops 34. Thus, when the rotor assembly rotates one revolution, the right portion of each stationary loop will be exposed to eight magnetic fields of alternating radial directions.

The rings of magnets 46 and 48 are essentially the same as the rings of magnets 44 and 50, but they are arranged so that their eight magnetic fields are directed oppositely to the directions of the axially adjacent fields produced by the magnets 446 and 50. The left portions of the loops 34 are exposed to the fields produced by the field magnets 46 and 48 so that each loop will simultaneous be exposed to one or more fields from magnets 44 and 50 and one or more opposing fields from magnets 46 and 48.

The electromagnet attraction bearing 8 includes a disc subassembly 28, which lies in a radial plane and is axially fixed on the shaft 4. Preferably, the disc 28 is formed of iron, but it may be formed of another material which is attracted to a magnetic field. Electromagnet attraction bearing 28 also includes the electromagnet assembly formed by the two electromagnets, 10 and 12. Electromagnets 10, 12 are concentric with the shaft 4, and they are positioned on axially opposite sides of disc assembly 28. Each of these electromagnets includes an annular coil of magnet windings, positioned in an annular core, which has two axially facing annular poles. The annular core should be formed of high permeability material, such as laminated steel.

When the electromagnet 10 is activated, it produces a magnetic field which attracts disc assembly 28, pulling the disc assembly 28 and shaft 4 toward itself and the left side in FIG. 1. When electromagnet 12 is activated, it produces a magnetic field which attracts the disc assembly 28 toward the right side in FIG. 1. In this manner, electromagnetic bearing 8 can move shaft 4 in the axial direction.

The operation of electromagnetic bearing 8 is controlled through the cooperation of the signal generator 18, the displacement-responsive generator 14, and the controller 16, as will now be explained.

When the shaft 4 is in its proper or prescribed position, the conductive loops 34 of the generator subassembly are subjected equally to the magnetic fields produced by magnets 44, 50 and the magnetic fields produced by magnets 46, 48, so that the net flux in the loops is zero. However, if shaft 4 moves to the right, the magnets 44, 46, 48 and 50 and their magnetic fields move so that the loops' exposure to the magnetic fields from magnets 44 and 50 increase, and their exposure to the magnetic fields from magnets 46 and 48 decreases. Thus, there will be a finite net flux in conductive loops 34. Because the rotation of shaft 4 moves the alternating magnetic fields relative to the stationary conductive loops 34, an alternating, near sinusoidal voltage is induced in the loops 34 as the loops enter and exit each magnetic field.

Figure 3:
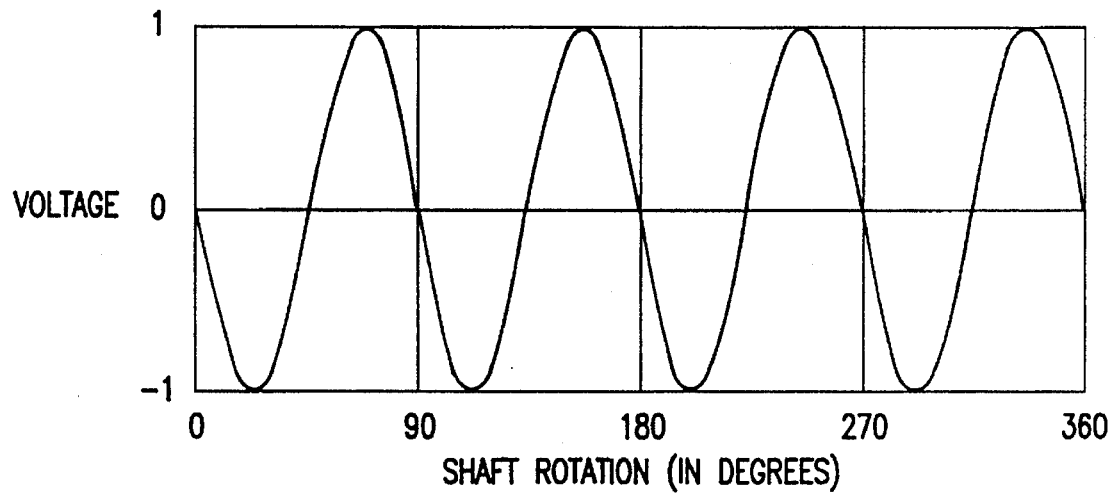
FIG. 3 is a graph of the voltage output of the displacement-responsive generator shown in FIGS. 1 and 2 when the rotor is displaced to the right.

In the illustrated embodiment, the voltage has one polarity during the transit of a given magnet field by the leading edge of a loop, and the opposite polarity during transit by the leading edge of the loop of the next magnet field in the circumferential path, so the frequency of the voltage per each rotation of shaft 4 is equal to half the number of loops 34. This voltage is transmitted to the controller 16 through connecting wires 40. The right output voltage of the loops 34 corresponding to this current produced when the loops move to the right is shown in FIG. 3.

Figure 4:
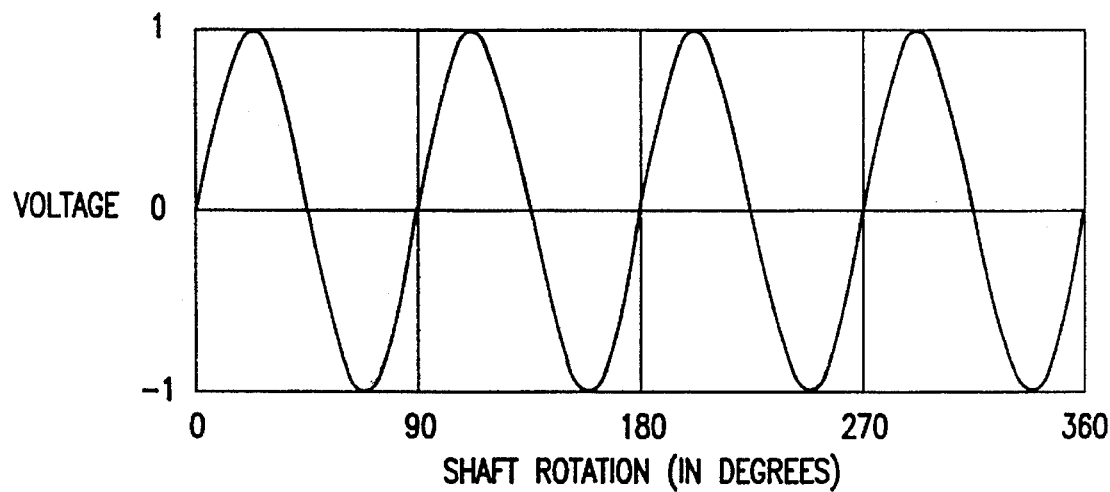
FIG. 4 is a graph of the voltage output of the generator shown in FIGS. 1 and 2 when the rotor is displaced to the left.

If shaft 4 moves to the left, magnets 44, 46, 48 and 50 move relative to the conductive loops 34 so that the loops' exposure to the fields from magnets 46 and 48 increases, and their exposure to the fields from magnets 44 and 50 decreases. Again, the finite net flux induces an alternating, near sinusoidal voltage in conductive loops 34, which has a number of cycles per shaft rotation of half the number of loops 34. The left output voltage of loops 34 resulting when shaft 4 moves to the left is shown in FIG. 4.

It should be noted that both the left and the right voltages can drive currents in the loops which interact with the magnetic fields inducing that current to produce Lorentz forces. When the controller closes a circuit for the current, these Lorentz forces tend to pull the loops 34 back into their prescribed path, in equilibrium between the magnetic fields from magnets 44, 50 and the magnetic fields from magnets 46, 48. However, with this embodiment of the invention, these forces are normally insufficient to return the loops 34 and thus the shaft 4 to their prescribed position, when large displacing forces are encountered.

As mentioned before, the amplitude of the induced voltage is linearly proportional to the displacement distance of the shaft from its prescribed position. It should also be noted that the voltage waveform corresponding to a left displacement of a given magnitude, shown in FIG. 4, is identical in frequency and amplitude to the voltage waveform corresponding to a right displacement of the same magnitude illustrated in FIG. 3, except that the two waveforms are 180 electrical degrees out of phase with each other. This difference in phase is used by controller 16 to control the direction of the forces of the electromagnetic attraction bearing 8.

Figure 5:
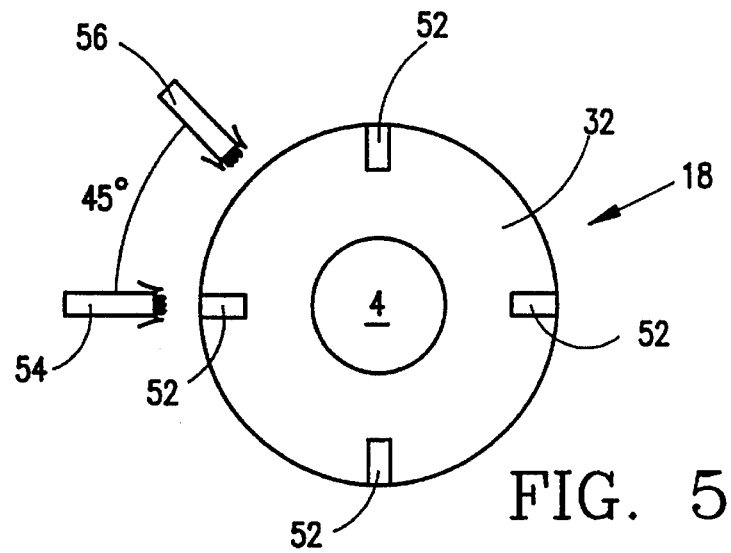
FIG. 5 is a schematic drawing of a signal generator according to the embodiment shown in FIG. 1.

The operation of controller 16 is governed by the electrical signals produced by signal generator 18. Signal generator 18 includes a stationary pickup coil subassembly 24 and a magnet mounting subassembly 32 which is concentric with and rotatively fixed to shaft 4. As shown in FIG. 5, magnets 52 are equally spaced on the circumference of the magnet mounting subassembly 32, such that a pole of each magnet 52 faces radially outward.

The purpose of the signal generator is to produce signal pulses which have a repetition rate which corresponds to the frequency of the voltages generated by the displacement-responsive generator 14. Since each magnet produces an individual pulse signal, the number of magnets 52 in the signal generator 18 should be half the number of loops 34 in the displacement-responsive generator 14. Accordingly, in this embodiment, there are four magnets 52 corresponding to the eight loops 34 of the displacement-responsive generator 14. Two pickup coils 54 and 56 are mounted on pickup coil assembly 24, radially facing magnets 52. These coils are circumferentially positioned 45° apart, concentric with shaft 4.

Figure 6:
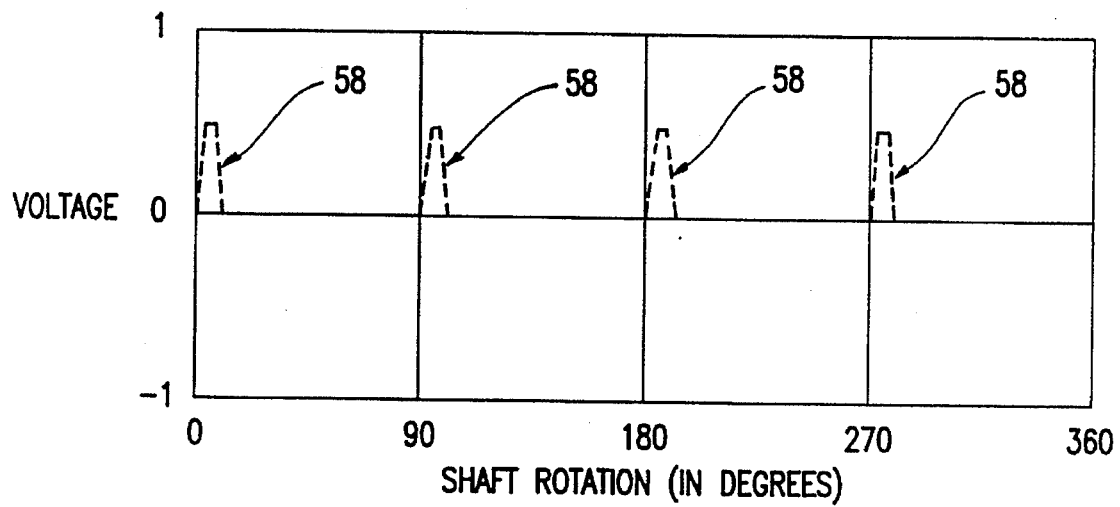
FIG. 6 is a graph of one set of the output pulses from the signal generator according to the embodiment shown in FIG. 1.

As shaft 4 rotates, each of the magnets 52 sequentially moves past coils 54 and 56. A voltage pulse is induced in each coil as a magnet passes by. Because the number of magnets 52 in the signal generator 18 is half the number of loops 34 in the displacement-responsive generator 14, the repetition rate of pulses produced in both coil 54 and coil 56 is equal to the frequency of the voltage induced in loops 34 when shaft 4 is displaced from its prescribed position. The output pulses 58 from coil 54 are shown in FIG. 6. The output pulses from coil 56, while not shown, are identical in amplitude and repetition rate with output pulses 58. However, since coil 56 is positioned 45° circumferentially apart from coil 54, the output pulses from coil 56 are 180 electrical degrees out of phase from output pulses 58. Both output pulses from coil 54 and coil 56 are separately fed to controller 16 through transmission wires 60.

The controller 16, in response to the output pulses from coils 54 and 56, distinguishes the voltage produced in the loops 34 when shaft 4 moves to the right from the voltage produced in loops 34 when shaft 4 moves to the left. The controller 16 uses the voltage produced in loops 34 when the shaft 4 moves left to drive a current in the right electromagnet 12 of the electromagnetic attraction bearing, thus pulling the shaft 4 back toward its prescribed position. In the same manner, controller 16 employs the voltage produced in loops 34 when the shaft 4 moves right to drive a current in the left electromagnet 10 of the electromagnetic attraction bearing 8, to pull shaft 4 back toward its prescribed position.

Figure 7:
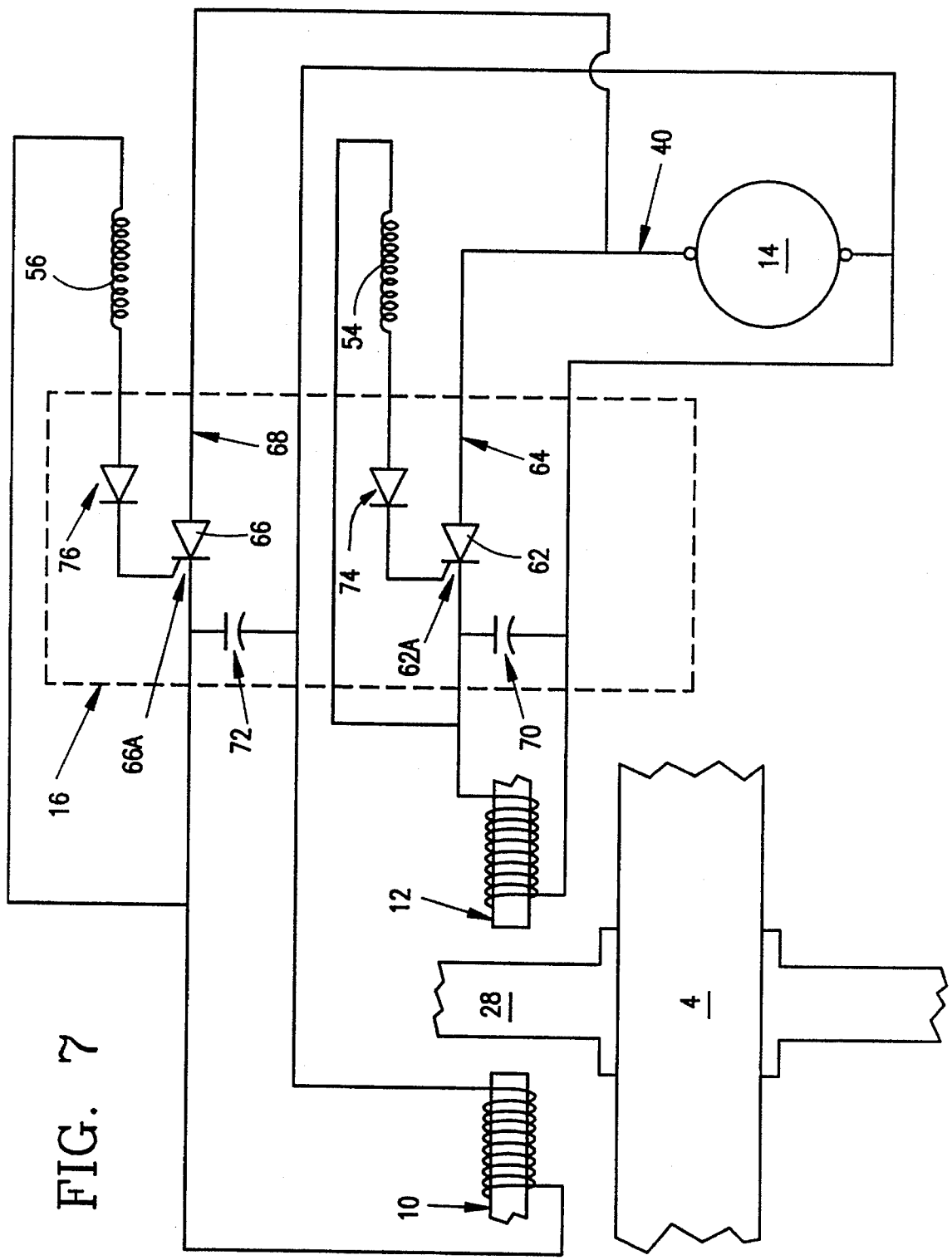
FIG. 7 is a circuit schematic of the controller according to the embodiment shown in FIG. 1.

As shown in FIG. 7, controller 16 includes a first controllable rectifier 62 and a first connecting wire 64. The controllable rectifier 62 and first connecting wire 64 electrically connect the voltage produced in loops 34 with windings of the right electromagnet 12 in the electromagnetic attraction bearing 8. Controller 16 also has a second controllable rectifier 66 and a second connecting wire 68, which electrically connect the voltage produced in loops 34 to windings of the left electromagnet 10. The control pin 62A of controllable rectifier 62 is electrically connected to receive the output pulses 58 of signal generator coil 54, while control pin 66A of controllable rectifier 66 is electrically connected to receive the output pulses of signal generator coil 56.

Both controllable rectifiers 62, 66 are silicon controlled rectifiers (SCRs). As is known in the art, silicon controlled rectifiers are diodes which are always off (meaning that they do not pass current) for negative biases. They are also off for positive biases, unless they are turned on by applying a voltage to their control pin, in which case they remain on until a negative voltage is applied, when they turn off again.

The operation of controller 16 will now be described with reference to rectifier 62. As noted before, when shaft 4 is in its prescribed axial position, displacement-responsive generator 14 does not generate voltage. However, when shaft 4 shifts from its prescribed position to the left, displacement-responsive generator 14 produces the output shown in FIG. 4. This output is applied to the input of rectifier 62 through connecting wires 64.

Figure 8:
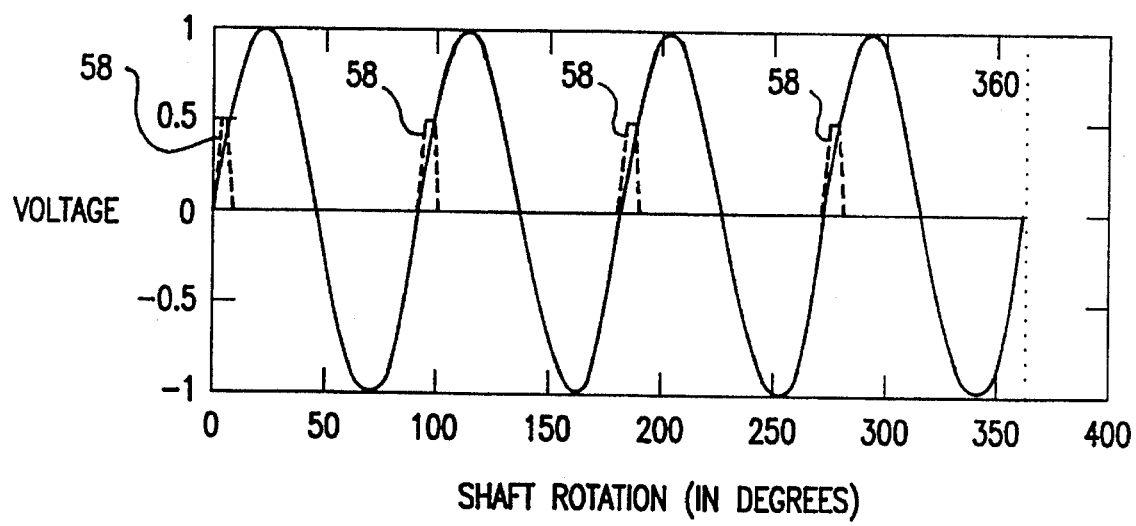
FIG. 8 is an overlay of the graph of FIG. 6 against the graph of FIG. 4.

The magnets 52 of the signal generator 18 are aligned with the loops 34 of the displacement-responsive generator 14 such that the pulses 58 from coil 54 are applied to the control pin 62A at the same time that the voltage output of displacement-responsive generator shown in FIG. 4 begins to increase from zero to its positive crest, as shown in FIG. 8. Thus, each pulse 58 from the signal generator 18 turns rectifier 62 on for the positive voltages from the displacement-responsive generator 14 output. When the output of the displacement-responsive generator 14 output becomes negative, this negative bias turns rectifier 62 off again, until the next pulse 58 from signal generator 14. Because rectifier 62 is on for the positive portions of the left displacement-responsive generator 14 output, it applies the voltage corresponding to these positive portions to the windings of the right electromagnet 12 of the electromagnetic attraction bearing 8, driving a current which causes electromagnet 12 to pull shaft 4 back toward its prescribed position.

It will be understood that the pulses 58 from the signal generator 18 occur when rectifier 62 is reverse biased, and thus do not cause rectifier 62 to connect the output of the displacement-responsive generator 14 to the right electromagnet 12 when shaft 4 moves to the right of its prescribed position. Since the right voltage of the displacement-responsive generator (shown in FIG. 3) is 180 electrical degrees out of phase with the left voltage of the displacement-responsive generator 14, output pulses 58 will never turn rectifier 62 on for positive values of the right voltage. Thus, the rectifier 62 will block the right output of the displacement-responsive generator 14 entirely, preventing the right output of the displacement-responsive generator from activating the right electromagnet 12.

It will be appreciated, however, that the right output of the displacement-responsive generator 14 will activate the left electromagnet 10 to pull shaft 10 towards the left. As noted before, rectifier 66, which channels current to the windings of left electromagnet 10, is controlled by pulses from coil 56, which are 180 electrical degrees out of phase from pulses 58. Thus, the pulses from coil 56 will turn rectifier 66 on for positive values of the right voltage from displacement-responsive generator 14. The pulses from coil 54 will never turn rectifier 66 on for positive voltages of the left output from displacement-responsive generator 14, so that the left voltage of generator 14 will never activate the left electromagnet 10.

It should be noted that the controller 16, as shown in FIG. 7, also includes optional smoothing capacitors 70 and 72, and bias diodes 74 and 76. Smoothing capacitors 70, 72, are placed in parallel with the windings of electromagnets 12 and 10 respectively. As is well known in the art, these smoothing capacitors are use to condition the current transmitted through controllable rectifiers 62, 66. As discussed above, bias diodes 74 and 76 block the negative pulses produced by coils 54 and 56, respectively, thereby protecting control pins 62A and 66A from these negative voltage pulses.

Figure 9:
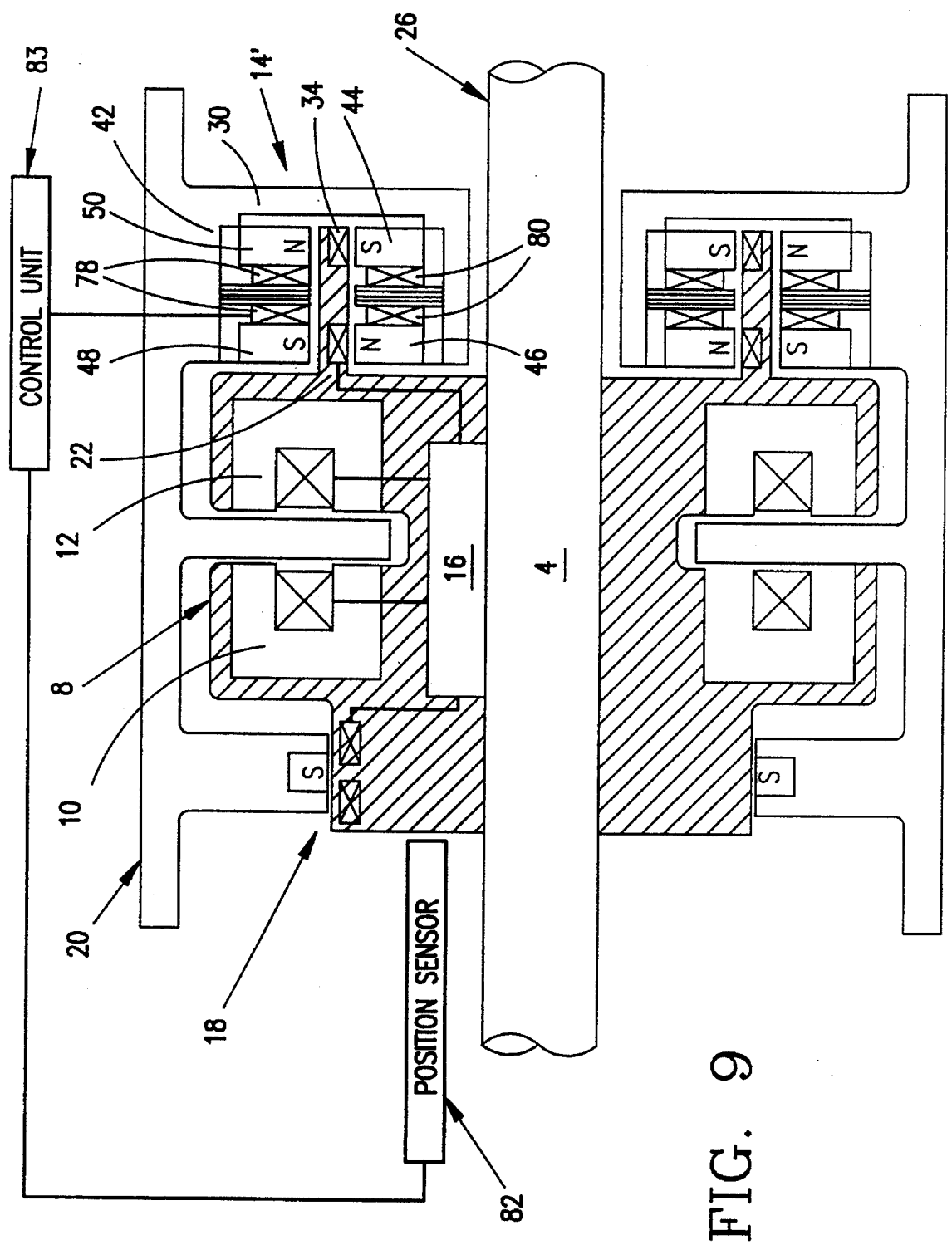
FIG. 9 is a cross-sectional view of a magnetic bearing system according to another embodiment of the invention.
Figure 10:
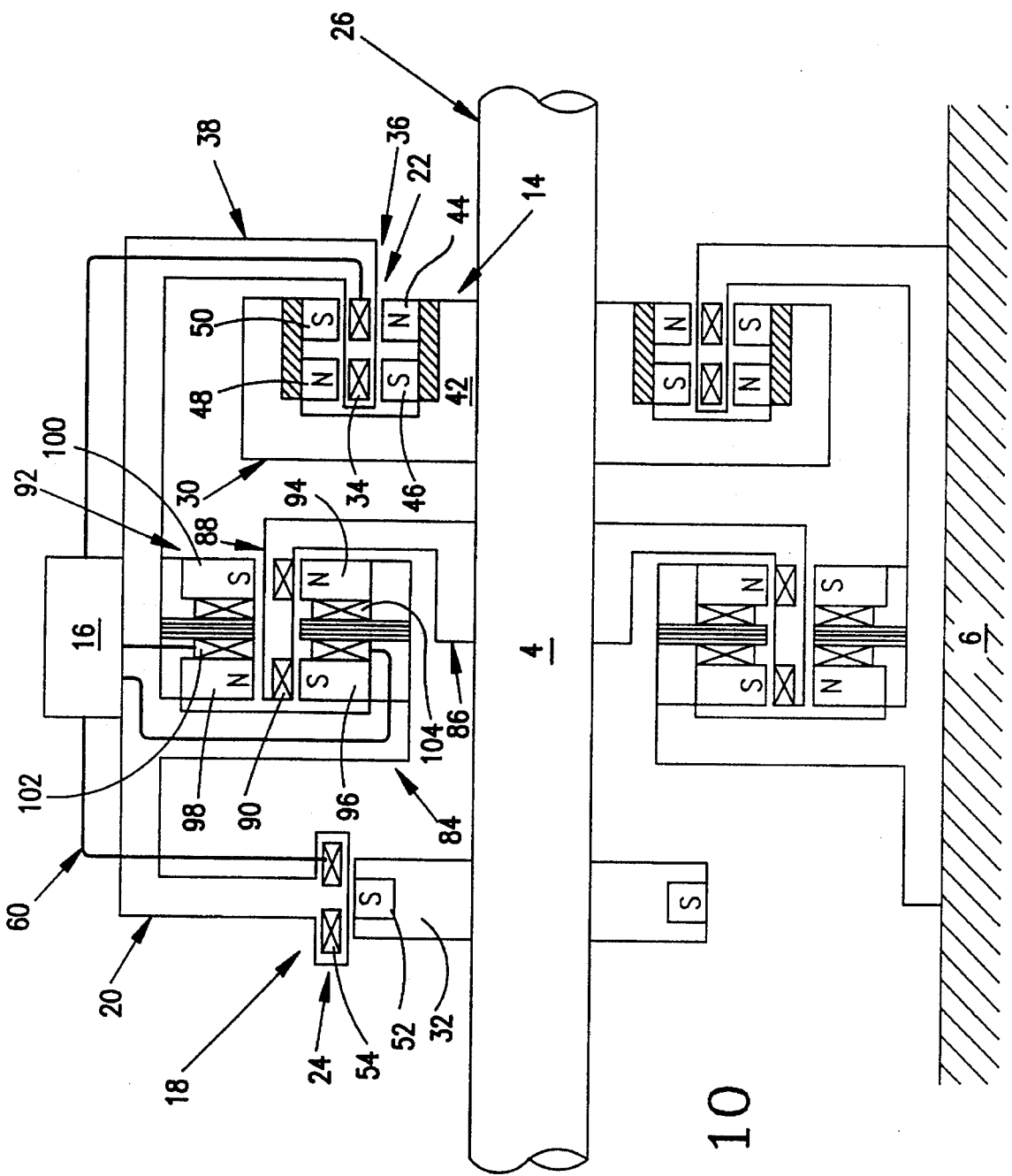
FIG. 10 is a cross-sectional view of a magnetic bearing system according to yet another embodiment of the invention.

Turning now to FIGS. 9 and 10, these Figures illustrate two variations of the embodiment of the invention shown in FIG. 1. In FIG. 9, the passive magnetic bearing displacement-responsive generator 14 is replaced by a semi-active magnetic bearing displacement-responsive generator 14'. Similarly, in the variation shown in FIG. 10, the electromagnetic attraction bearing 8 is replaced with a semi-active magnetic bearing.

The semi-active magnetic bearing illustrated in FIGS. 9 and 10 is disclosed in U.S. Pat. No. 5,302,874, which has been incorporated entirely herein by reference. The semi-active magnetic bearing displacement-responsive generator 14' of FIG. 9 is very similar to the passive bearing displacement-responsive generator 14 of FIGS. 1 and 2, except that the stationary components of passive bearing displacement-responsive generator 14 are rotating for semiactive bearing displacement-responsive generator 14'. For example, it has a loop subassembly 22, which is axially fixed to the shaft 4, and which has a plurality of conductive loops 34. It also has a stationary magnet subassembly 30, which includes a housing 42, in which four rings 44, 46, 48, 50 of permanent field magnets are mounted. Like the passive bearing displacement-responsive generator 14, each magnet in the rings has two circumferentially spaced poles, and the magnets in each ring are arranged to provide a plurality of alternating radial magnetic fields between radially opposed magnets 44 and 50, and between 46 and 48. Further, magnets 44 and 50 are arranged so that their circumferentially alternating radial magnetic fields are opposite to the radial magnetic fields produced by the magnets 46 and 48.

Figure 11:
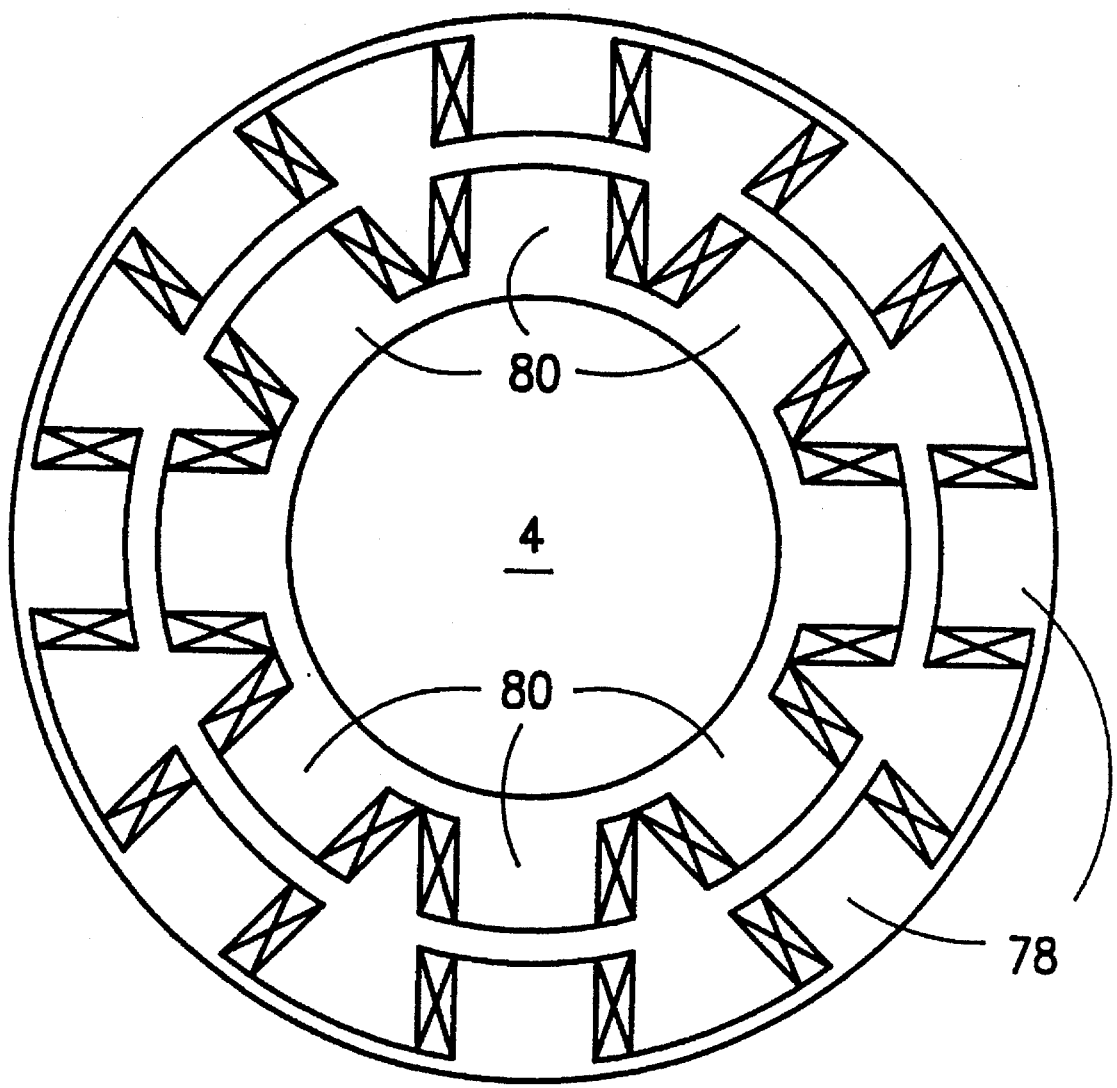
FIG. 11 is a cross-section of electromagnets in the semi-active bearing according to the embodiment shown in FIG. 9.

Unlike the passive displacement-responsive generator 14, however, the semiactive displacement-responsive generator 14' has a first ring 78 of controllable electromagnets between axially adjacent magnet rings 48 and 50, and a second ring 80 of controllable electromagnets between axially adjacent magnet rings 44 and 46, as is shown in FIG. 11. These electromagnet rings are controlled by a position sensor 82, which senses the position of the rotor assembly 26 relative to the stator assembly 20, and an externally powered control unit 83, which activates the electromagnets of rings 78, 80 in response to sensed position changes.

For example, if shaft 4 moves from its prescribed position to the right, position sensor 82 and control unit 83 cooperate to activate the electromagnets in rings 78 and 80 so that they produce between them a plurality of circumferentially alternating radial magnetic fields, identical in polarity with the net radial magnetic fields produced by magnet rings 44 and 50. If shaft 4 moves from its prescribed position to the left, the position sensor 82 and control unit 83 activate the electromagnets in rings 78 and 80 so that they produce a plurality of circumferentially alternating radial magnetic fields identical in polarity with the net radial magnetic field produced by magnet rings 46 and 48.

Thus, the electromagnets in rings 78 and 80 are controlled by the position sensor 82 and the control unit 83 to reinforce the effect of the net field from magnet rings 44, 46, 48 and 50. From this, it will be understood that the semiactive magnetic bearing displacement-responsive generator 14' operates in essentially the same manner as the passive magnetic bearing displacement-responsive generator 14, but is capable of producing output voltages with a greater amplitude than a passive magnetic bearing displacement-responsive generator of the same size.

In FIG. 10, the semi-active magnetic bearing 84 is similar in structure with the semi-active magnetic bearing displacement-responsive generator 14' shown in FIG. 9. It has a loop subassembly 86, which is axially fixed to the shaft 4. Loop assembly 86 includes a cylinder 88, which has a plurality of conductive loops 90. It also has a stationary magnet subassembly 92, with four rings 94, 96, 98, and 100 of permanent field magnets. Each magnet in the rings has two circumferentially spaced poles, and the magnets in each ring are arranged to provide a plurality of circumferentially alternating radial magnetic fields between radially opposed magnets 94 and 100, and between 96 and 98. As with the previously-discussed semiactive magnetic bearing, magnets 94 and 100 are arranged so that their circumferentially alternating radial magnetic fields are opposite to the radial magnetic fields produced by the magnets 96 and 98.

The semiactive magnetic bearing also has a first ring 102 of controllable electromagnets between axially adjacent magnets 98 and 100, and a second ring 104 of controllable electromagnets between axially adjacent magnets 94 and 49. When the shaft 4 moves from its prescribed position to the left, displacement-responsive generator 14 produces a left current, which is modified by controller 16, and transmitted to windings of the electromagnets in electromagnetic rings 102 and 104 of the semi-active magnetic bearing 84. The polarity of this current drives the electromagnets to produce a plurality of circumferentially alternating radial magnetic fields which reinforce the circumferentially alternating fields produced by the field magnets in rings 96 and 98.

Because the loop subassembly 86 of the semi-active magnetic bearing 84 is also moved to the left when the shaft 4 moves, the loops 90 are exposed to the finite flux produced by the electromagnet rings 102 and 104, and the field magnets 96 and 98. This finite flux induces a current in the loops 90, which then interacts with the magnetic fields from the field magnets 96 and 98, producing a force which pulls the loop subassembly 86, and thus shaft 4, back toward the right.

A similar operation occurs when the shaft 4 moves from its prescribed position to the right, except that the voltage produced by the displacement-responsive generator 14 is transmitted through the controller 16 to drive current in the electromagnets 102 and 104, but controller 16 applies the generated voltages to oppositely wound windings of the electromagnets, which produces magnetic fields which are opposite to the fields produced when the shaft 4 moves to the left. Thus, the current drives these electromagnets to reinforce the circumferentially alternating and radial magnetic fields produced between magnets 94 and 100. The current in the loops 90 induced by the magnetic fields from the electromagnets 102, 104, and the field magnets 94, 100, then interacts with the magnetic fields from field magnets 94 and 100 to pull the loop subassembly 86 back to the left.

It will be understood from the above description that the passive magnetic bearings and the semi-active magnetic bearing can be used interchangeably for any embodiments of the invention. For example, the displacement-responsive generator and the rotor supporting bearing can both be semi-active magnetic bearings.

Another embodiment of the invention will now be discussed with reference to FIGS. 12 and 13. Whereas the previously discussed embodiments of the invention have been axial bearings, FIGS. 12 and 13 illustrate one embodiment of a radial bearing according to the claimed invention.

Figure 12:
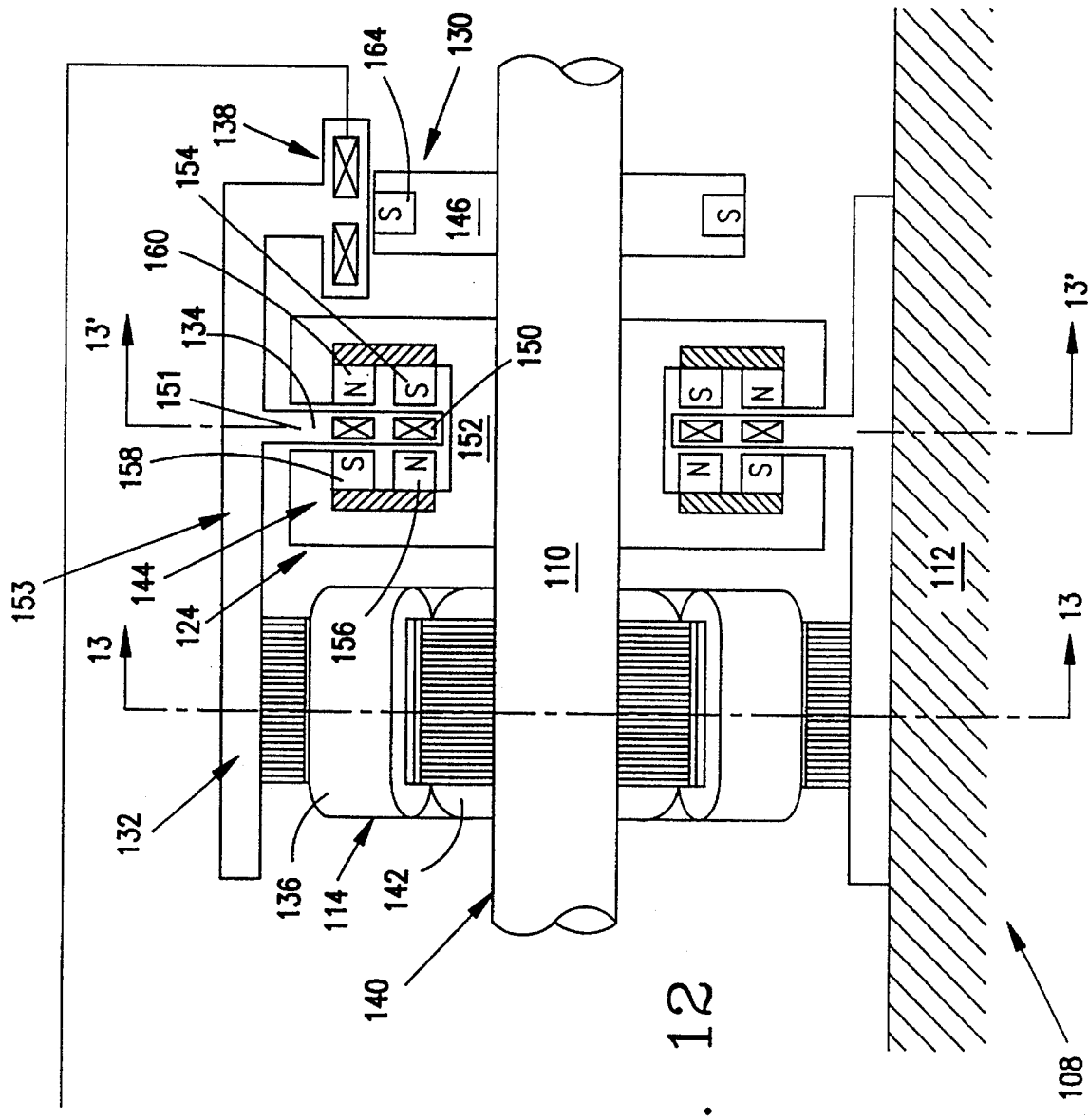
FIG. 12 is a cross-sectional view of a magnetic bearing system according to still another embodiment of the invention.

The bearing system 108 shown in FIG. 12 is similar to the system shown in FIG. 1, but it utilizes a radial attraction-type bearing activated by a generator which produces an output voltage in response to radial deviation of the rotor. It provides radial support for a rotatable shaft 110 on a stationary support surface 112. Whenever the position of the shaft 110 deviates in a radial direction from a prescribed position, the bearing system 108 will produce corrective forces which pull the shaft toward the prescribed position.

Figure 13:
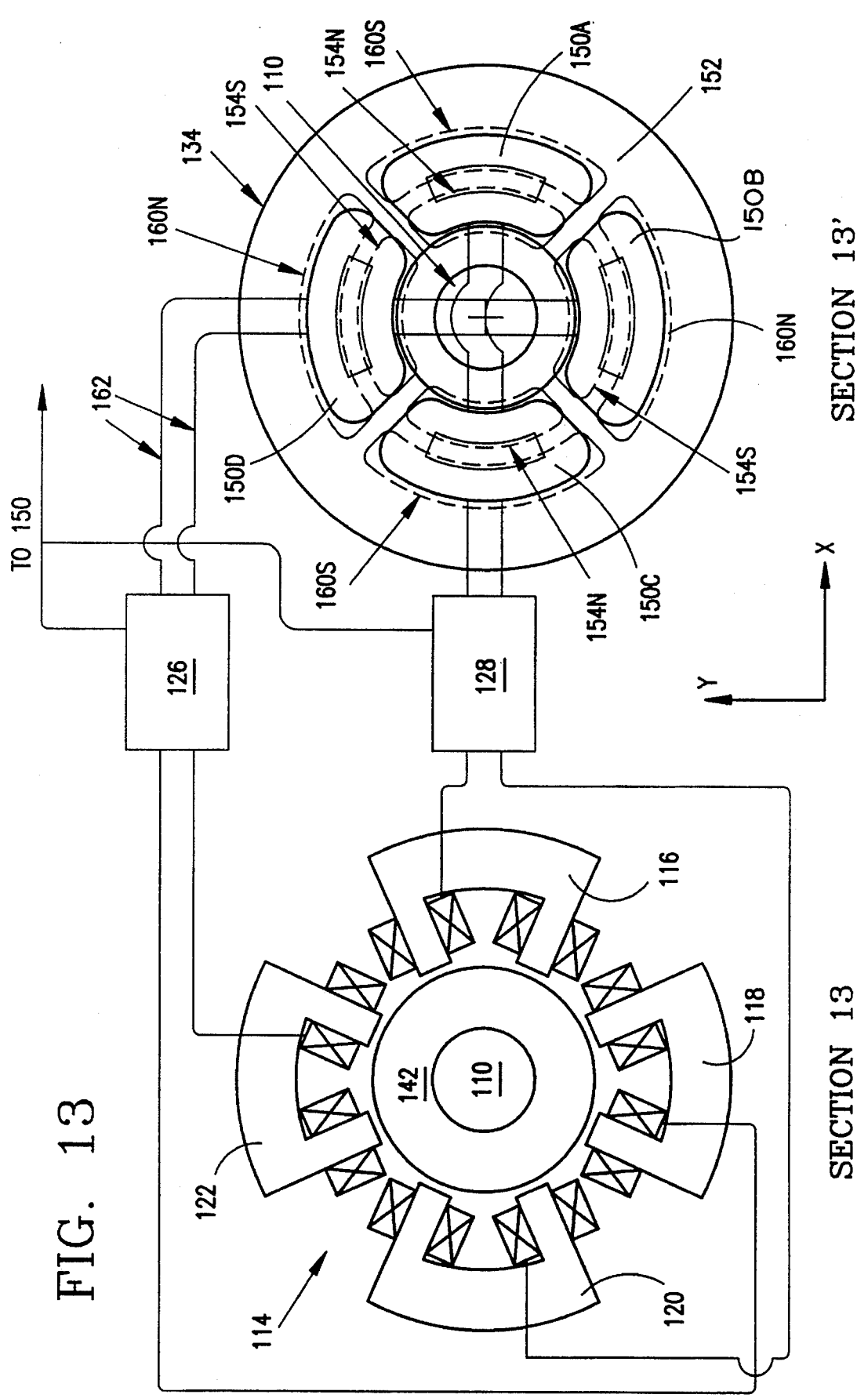
FIG. 13 are two cross sections along sectional lines 13—13 and 13'—13'.

The bearing system of FIGS. 12 and 13 includes a magnetic bearing 114 which has four electromagnets 116, 118, 120, and 122, for exerting the restorative force on the shaft 110, an electric generator 124 which creates the voltage for driving currents in the bearing 114, and a pair of controllers 126 and 128 which operate in response to signals from a signal generator 130 to selectively apply voltages from the generator 124 to the electromagnets 116, 118, 120, and 122.

The stationary components of the apparatus, i.e. its stator assembly 132, include a loop subassembly 134 of the current generator, an electromagnet subassembly 136 of the bearing, two controllers 126 and 128, and a pickup coil subassembly 138 of the signal generator 130. The rotating components which constitute the rotor assembly 140 are the shaft 110, an armature subassembly 142 of the magnetic bearing 114, a magnet subassembly 144 of the electric generator 124, and a magnet subassembly 146 of the signal generator 130.

Discussing the individual components of this embodiment of the invention in more detail, the electrical generator 124 shown in FIGS. 12 and 13 is a passive magnetic bearing displacement-responsive generator. It includes the stationary loop subassembly 134 and the rotating magnet subassembly 144.

As seen in FIG. 13 the loop subassembly 134 includes four loops or coils 150 mounted on a stationary disc 151, equally spaced around its circumference. The disc 151 is nonmagnetic and nonconductive, and it is supported by one or more fixed members 153. The loops 150 are electrically connected in the manner shown in FIG. 14. Loops 150A and 150C are connected in series to controller 128. Loops 150B and 150D are connected to controller 126. Loops 150A and 150C are cross-connected together, as are loops 150B and 150D. Thus, if any two opposite loops pass through opposite magnetic fields simultaneously, a single direction current is induced in the loops when the loops and/or the magnets deviate from their prescribed paths. This type of connection is described in more detail in U.S. Pat. No. 5,302,874, which has been incorporated entirely herein by reference.

The magnet subassembly 144 includes a housing 152 which is rotationally and axially fixed to the shaft 110. Four rings of permanent field magnets 154, 156, 158, and 160 are mounted in the housing 152. For purposes of this explanation, it will be again understood that all magnets in any ring are identified by the same reference numeral as shown in FIGS. 12 and 13. Each ring has two magnets, and each magnet has two circumferentially spaced poles. The magnetic fields from the magnets of ring 154, 154N and 154S, and the magnetic fields, from the magnets of ring 160, 160N and 160S, are shown in FIG. 13 with a dotted line.

The poles of inboard magnets 154 face axially outwardly in the left direction, and they are axially aligned with the rightwardly facing poles of opposite polarities of the inboard magnets 156. These two inboard magnet rings provide four axial magnetic fields to which the loops are exposed. The direction of the flux lines in these fields alternate successively around the circumference of the magnet subassembly 144. Thus, when the shaft 110 turns, the magnets 154, 160 of the magnet subassembly 144 travel in a circular path so that their respective fields move relative to the loops 150. When the shaft 110 rotates one revolution, the inboard portion of each stationary loop will be exposed to four magnetic fields of alternating axial directions. This results in two electrical cycles per mechanical revolution.

The rings of magnets 158 and 160 are essentially the same as the rings of magnets 154 and 156, but they are arranged so that their magnetic fields are directed oppositely to the directions of the radially adjacent fields produced by the magnets 154 and 156. The outboard portions of the loops 150 are exposed to the fields produced by the field magnets 158 and 160 so that each loop will simultaneously be exposed to one or more fields from inboard magnets 154 and 156 and or more opposing fields from outboard magnets 158 and 160.

The electromagnet attraction bearing 114 includes an armature subassembly 142, which is axially and concentrically fixed on the shaft 110. Preferably, the armature 142 is formed of iron laminations, but it may be formed of another material which is attracted to a magnetic field. Electromagnet attraction bearing 114 also includes the electromagnet assembly formed by the four electromagnets, 116, 118, 120 and 122. Electromagnets 116, 118, 120, and 122 are concentric with the shaft 110, and they are equally spaced around the circumference of the armature 142. Each of these electromagnets includes a U-shaped core and two coils of windings which are wound around the two legs of the core.

When the electromagnet 122 is activated, it produces a magnetic field which attracts armature 142, pulling the armature 142 and thus the shaft 110 up, i.e. in a positive Y-axis direction in FIG. 13. When electromagnet 118 is activated, it produces a magnetic field which attracts the armature 142 down, i.e. in a negative Y-axis direction in FIG. 13. Similarly, the magnets 120 and 116 attract the armature 142 in positive and negative X-axis directions, respectively. In this manner, electromagnetic bearing 114 can move shaft 110 in any radial direction. The operation of electromagnetic bearing 114 is controlled through the cooperation of the signal generator 130, the displacement-responsive generator 124, and the controllers 126 and 128, as will now be explained.

When the shaft 110 is in its proper or prescribed position, the conductive loops 150 of the generator subassembly are subjected equally to the magnetic fields produced by the inboard magnets 154, 156 and the magnetic fields produced by the outboard magnets 158, 160, so that the net flux in all of the loops is zero.

Figure 14:
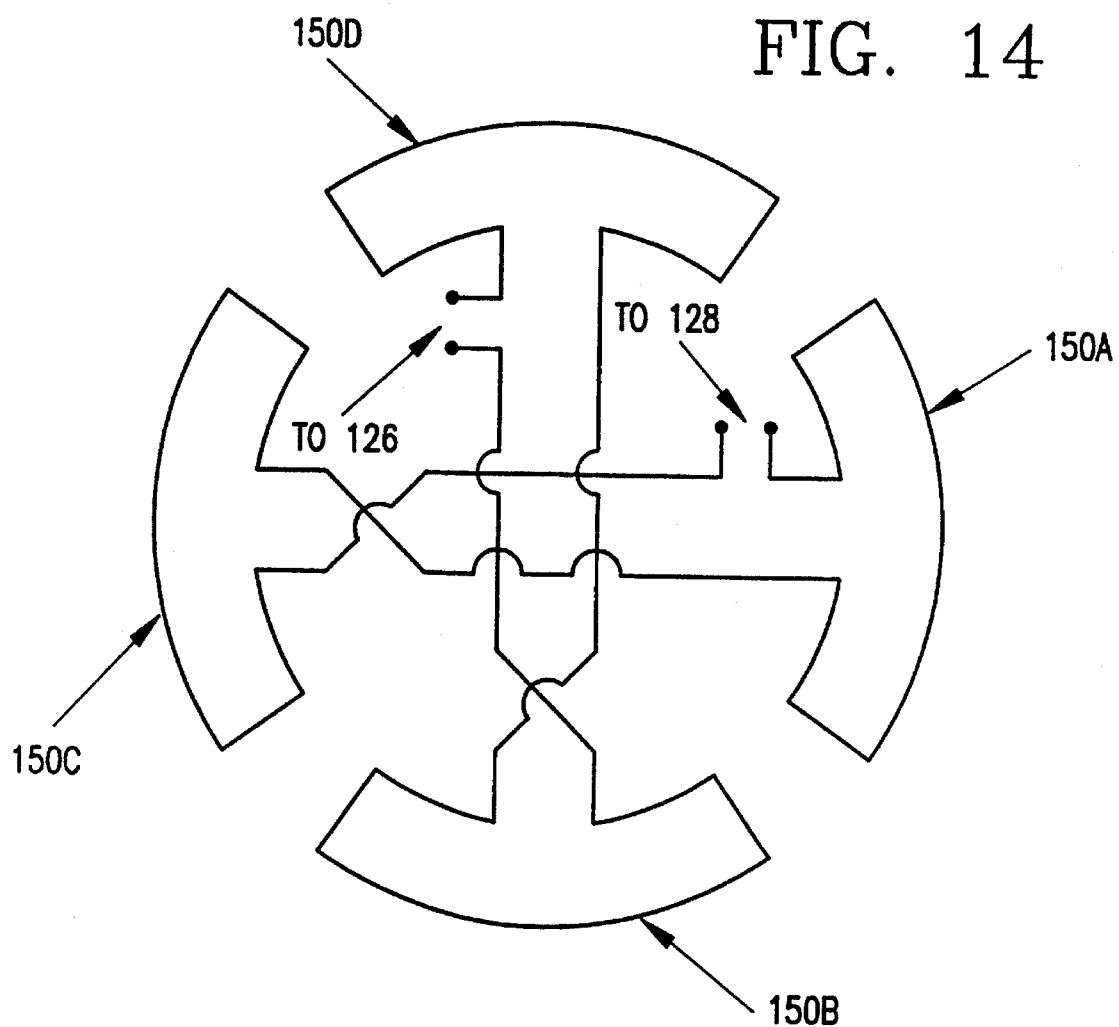
FIG. 14 is a wiring schematic for the loops according to the embodiment shown in FIGS. 12 and 13.

However, if shaft 110 moves down, in the negative-Y direction, the magnets 154, 156, 158 and 160 and their magnetic fields move so that loop 150B is more exposed to the magnetic fields from magnets 158 and 160 than to the magnetic fields from magnets 154 and 156, while loop 150D is more exposed to the magnetic fields from magnets 154 and 156 than to the magnetic fields from magnets 158 and 160. Loops 150B, 150D are cross-connected, as shown in FIG. 14, so there will be a finite net flux in these loops. The rotation of shaft 110 moves the circumferentially alternating magnetic fields relative to the stationary conductive loops 150B and 150D, inducing an alternating, near sinusoidal voltage in these loops. This negative-Y output current is transmitted to the controller 126 through connecting wires 162.

In the same way, if shaft 110 moves up in the positive-Y direction, magnets 154, 156, 158, and 160 move relative to the conductive loops 150B and 150D so that the loop's 150B exposure to the fields from magnets 154 and 156 increases, and its exposure to the fields from magnets 158 and 160 decreases. At the same time, loop 150D is exposed more to the fields from magnets 158 and 160 and its exposure to the fields from magnets 154 and 156 decreases. The finite net flux resulting from this exposure will induce an alternating, near sinusoidal voltage in conductive loops 150B, 150D. As in the previously discussed embodiments, the Y-positive voltage generated when the shaft 110 moves in the Y-positive direction is 180 electrical degrees out of phase from the Y-negative voltage when the shaft 110 moves in the Y-negative direction. As will be discussed later, this feature is used by the controller 126 to discriminate the Y-positive voltage from the Y-negative voltage.

It will be apparent from FIG. 13' that when the shaft 110 moves to the right, in the X-positive direction, loop 150A is more exposed to the magnetic fields from magnets 154 and 156 than the fields from magnets 158 and 160, while loop 150C is more exposed to the magnetic fields from magnets 158 and 160 than the fields from magnets 154 and 156. This induces an X-positive voltage in these loops.

Similarly, when shaft 110 moves to the left in the X-negative direction, the loop 150A is more exposed to the fields from magnets 158 and 160, while they are less exposed to the fields from magnets 154 and 156. At the same time, loop 150C is more exposed to the fields from magnets 154 and 156, while they are less exposed to the fields from magnets 158 and 160, inducing an X-negative voltage in the loops which is 180 electrical degrees out of phase from the X-positive voltage. Further, from the symmetry of magnets 154 and 160 relative to loops 150, as shown in FIG. 13', it will be clear that the Y-positive voltage is in phase with the X-negative voltage, while the Y-negative voltage is in phase with the X-positive voltage.

The voltage from the displacement-responsive generator is rectified and discriminated by controllers 126 and 128. These controllers are identical in structure and operation to the controllers of the previously discussed embodiments. Like the previously discussed controllers, controllers 126 and 128 operate in response to signals from a constant phase signal generator 130, which is also similar in structure and operation to the signal generator of the previously discussed embodiments.

Figure 15:
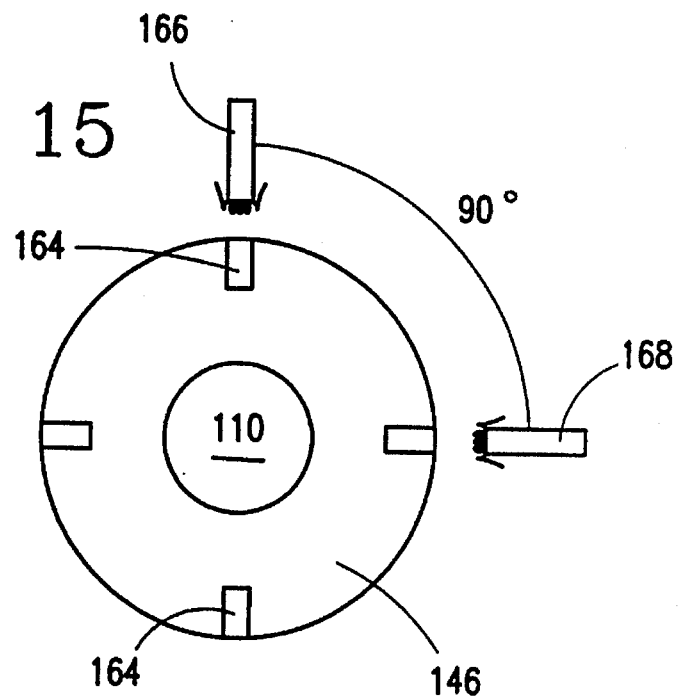
FIG. 15 is a schematic diagram of signal generator according to the embodiment shown in FIGS. 12 and 13.

Like the signal generator 18 of the first embodiment, signal generator 130 has a magnet mounting subassembly 146 with a plurality of magnets, and a pickup coil subassembly 138 with two pickup coils. However, as shown in FIG. 15, the magnet mounting subassembly 138 of this signal generator has only two diametrically opposed magnets 164. As has been explained, the number of magnets of the magnet mounting subassembly is half the number of loops in the loop subassembly of the associated displacement-responsive generator, and the repitition rate of the signals from the signal generator is equal to the frequency of the voltage produced by the displacement-responsive generator.

Similar to the signal generators of the first embodiment, the first pickup coil 166 is aligned with the loops 150 so that the signal pulse produced by the first pickup coil 166 coincides with the start of the positive voltage increase produced by the X-positive and Y-negative currents. Second pickup coil 168 is located 90° circumferentially from the first pickup coil 166, so that the signal pulse from the second pickup coil is 180 electrical degrees out of phase from the signal pulse of the first pickup coil 166.

Controllers 126 and 128 are structurally identical to the controller 16 of the first embodiment shown in FIG. 7, and controllers 126 and 128 will be explained with reference to FIG. 7. It should be noted, however, that connective wires 64 and 68 of controller 126 is connected to loops 150B and 150D, while connective wires 64 and 68 of controller 126 is connected to loops 150A and 150D.

As noted before, the signal pulse from pickup coil 166, as applied to controlled diodes 62 and 66, coincides with the start of the positive voltage increase produced by the X-positive and Y-negative currents. Accordingly, when the shaft 110 moves in the Y-negative direction, the signal pulse from pickup coil 166 activates controlled rectifier 62 of controller 126 to apply the Y-negative voltage to the top electromagnet 122, but does not activate controlled rectifier 66, no voltage is transmitted to the bottom electromagnet 118. When the shaft 110 moves in the Y-positive direction, the signal pulse from pickup coil 168 activates controlled rectifier 62 of controller 126 to apply the Y-positive voltage to the bottom electromagnet 118, but does not activate controlled rectifier 66, so no voltage is applied to the top electromagnet 122. Optional smoothing capacitors 70 and 72 can condition both the rectified Y-negative and rectified Y-positive current to approximate DC current.

In the same fashion, when the shaft 110 moves in the X-positive direction, the signal pulse from pickup coil 166 activates controlled rectifier 62 of controller 128 to apply the X-positive voltage to the left electromagnet 120, but does not activate controlled rectifier 66, so no voltage is applied to the right electromagnet 116. If shaft 110 moves in the X-negative direction, the signal pulse from pickup coil 168 activates controlled rectifier 62 of controller 128 to apply the X-negative voltage to the right electromagnet 116, but does not activate controlled rectifier 66, so no voltage is applied to the left electromagnet 120. Again, optional smoothing capacitors 70 and 72 can condition both the rectified X-negative and rectified X-positive current to approximate DC current.

Thus, the controllers 126 and 128 effectively control the application of voltages produced by the displacement-responsive generator 124 when shaft 10 is displaced from its prescribed position, and properly activate the electromagnetic attraction bearing 114 to reposition the shaft 110. It will be appreciated that this radial magnetic bearing will correct the radial displacement of the shaft 110 in any direction. For example, if the shaft 110 is displaced in both the Y-positive and the X-positive direction, the loops 150 will produce both Y-positive and X-positive current to activate the electromagnetic bearing to return the shaft 110 to its prescribed position.

It will be apparent that there are many possible variations of the above-discussed embodiments. It may be desirable in some applications to increase the current in the bearing by using an amplifier, such as a rotary amplifier mounted on the same shaft as the magnetic bearing and the displacement-responsive generator.

Also, it is possible to modify the controller circuit discussed above. For example, the positive and negative voltages from the generator can be rectified with a full wave bridge rectifier. The pulses from the signal generator can then be used to operate the controlled rectifiers to select one of two pass transistors that switch the full wave rectified voltages to the electromagnets of the bearing.

Figure 16:
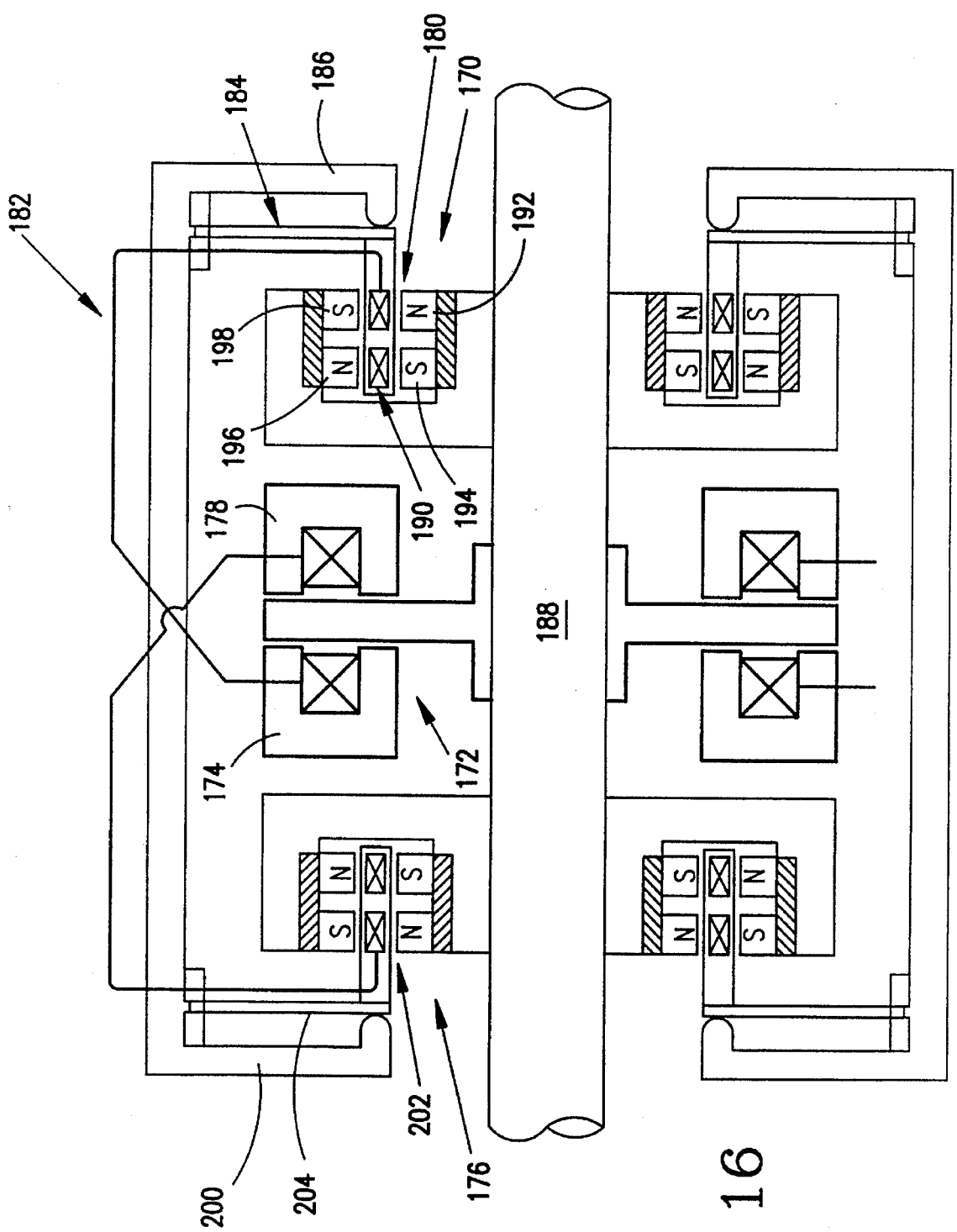
FIG. 16 is a cross-sectional view of a magnetic bearing system according to still another embodiment of the invention.

FIG. 16 illustrates yet another embodiment of the invention. This embodiment does not employ a controller or a signal generator, but instead uses two displacement-responsive generators. A right passive magnetic bearing displacement-responsive generator 170 drives a left electromagnet 174 of an electromagnet attraction bearing 172, while a left passive magnetic bearing displacement-responsive generator drives a right electromagnet 178 of the electromagnet attraction bearing.

Displacement-responsive generators 170 and 176 are passive magnetic bearings like the displacement-responsive generator 14 in FIG. 1. However, the loop subassembly 180 of displacement-responsive generator 170 is not stationary, but is instead supported on the stator 182 by a flexible member 184, so that it is displaceable in the axial direction. Preferably, the flexible member 184 is made of a resilient sheet material, but it can be made of any material or mechanism which supports the loop subassembly 180 such that it can be displaced in the axial direction. This embodiment of the invention also includes a stop 186, which limits the displacement of the displacement-responsive generator 170 in the right direction, as will be explained in more detail.

When the shaft 188 is in its prescribed position, the loop subassembly 180 is in its normal position, where the loops 190 move along a prescribed path relative to the magnet rings 192, 194, 196 and 198. While on this path, the loops are equally exposed to the circumferentially alternating radial magnetic fields from magnet rings 192 and 198 and the alternating radial magnetic fields from magnet rings 194 and 196. If the shaft 188 moves from its prescribed position, the loops 190 will be exposed to a finite net flux from either magnet rings 192 and 198 or magnet rings 194 and 196.

As discussed above, exposure to this finite flux induces a near sinusoidal voltage in the loops 190. This voltage drives a current in the loops 190 which interacts with the finite magnetic flux, producing Lorentz forces which urge the loops back toward their prescribed path relative to the magnet rings 192, 194, 196, and 198. In the previously discussed embodiments of the invention, the forces produced by this current were insufficient to produce large forces on either the rotor or the stator, and the loop subassembly could not effectively move itself from its normal position in either the right or left direction. In this embodiment, the loop subassembly 180 likewise cannot move from its normal position in the right direction, since its right movement is obstructed by the stop 186. However, the loop subassembly 180 is free to move in the left direction, separate from the stator 182.

Accordingly, when shaft 188 moves to the right of its prescribed position, the loop subassembly 180 is held stationary by the stop 186, and the loops 190 are exposed to a net finite flux from magnet rings 194 and 196. This flux produces a sinusoidal-like current in the loops 190, which is transmitted to the left electromagnet 174 of electromagnetic attraction bearing 172. This current drives the left electromagnet 174 to pull the shaft 188 back toward its prescribed position.

When shaft 188 moves to the left of its prescribed position, the loops are also exposed to a net finite flux, from magnet rings 192 and 198, inducing a current in the loop which interacts with the magnetic fields from these rings to produce a leftward force on the loop subassembly 180. Because loop subassembly 180 is freely displaceable in the left direction, the force produced by this current pulls the loop subassembly to the left with the shaft 188, maintaining the loops 190 in their prescribed path relative to magnets 192, 194, 196 and 198. Thus, only a tiny current flows through the left electromagnet 174, so that only right movement of the shaft 188 will drive large currents in the left electromagnet.

In a similar fashion, displacement-responsive generator 176 and stop 200 cooperate to ensure that only left movement of the shaft 188 will drive large currents in the right electromagnet 178. Displacement-responsive generator 176 is a mirror image of displacement-responsive generator 170, and its loop subassembly 202 is supported to the stator 182 by a flexible member 204 identical to flexible member 184. In the same way stop 186 limits the movement of loop subassembly 180 from its normal position in the right direction, stop 200 limits the loop subassembly 202 from its normal position in the left direction.

Figure 17:
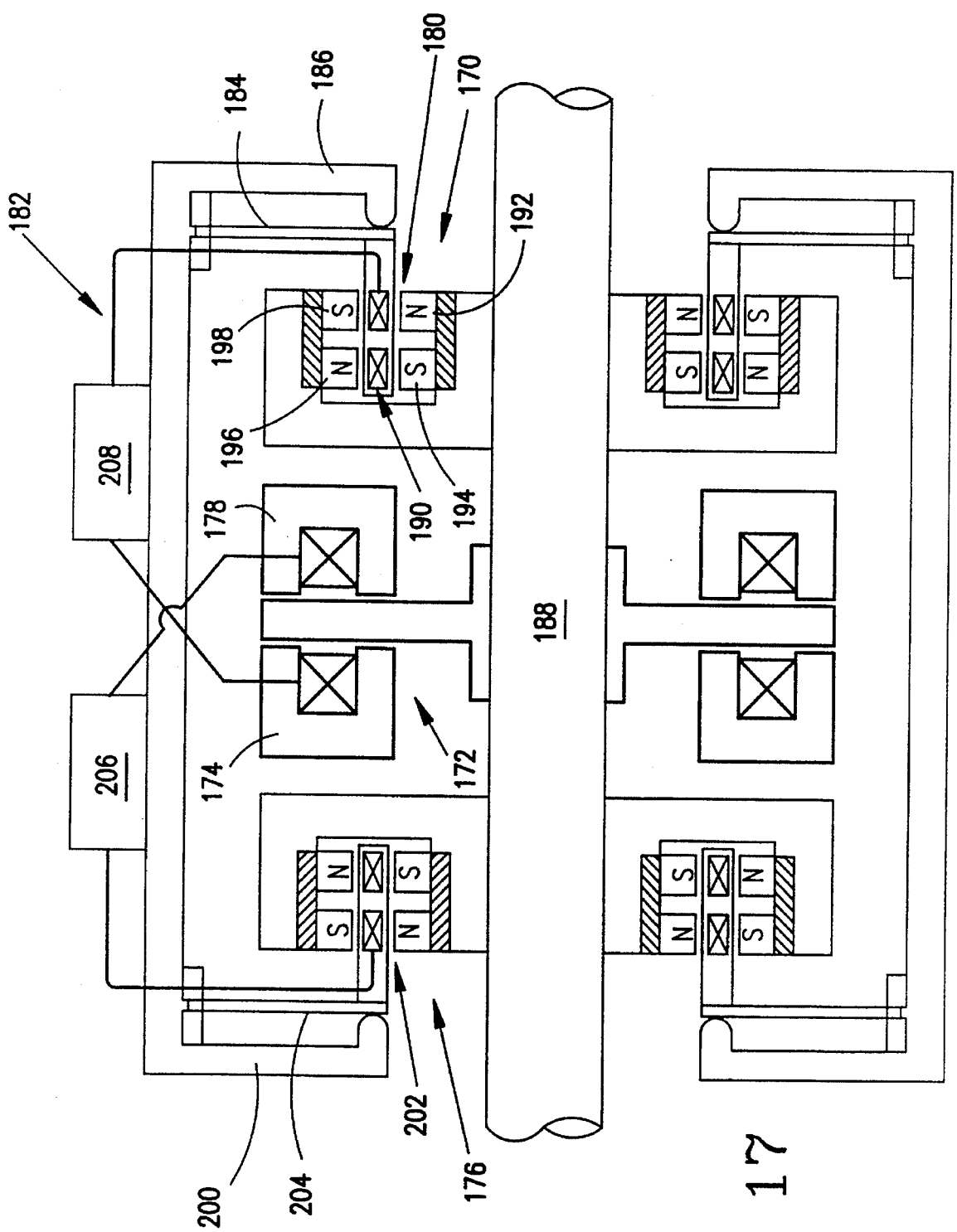
FIG. 17 is a cross-sectional view of a magnetic bearing system according to yet another embodiment of the invention.

It will be appreciated that, with the embodiment shown in FIG. 16, the displacement-responsive generators 170 and 176 transmit nearly sinusoidal current to electromagnets 174 and 178, respectively. Accordingly, the electromagnet attraction bearing 172 should be laminated to reduce AC losses. Alternatively, the currents transmitted to these electromagnets from the displacement-responsive generators can be conditioned by rectifying circuits, as is shown in FIG. 17.

Here, rectifier 206 rectifies the current transmitted from the displacement-responsive generator 176 to the right electromagnet 178 with conventional circuitry, such as a full wave bridge rectifier. The current can also be smoothed to approximately DC current by a smoothing capacitor in parallel with electromagnet 178. Similarly, rectifier 208 rectifies the current transmitted from the displacement-responsive generator 170 to the left electromagnet 174 with a full-wave bridge rectifier, and can smooth the current with a smoothing capacitor.

Figure 18:
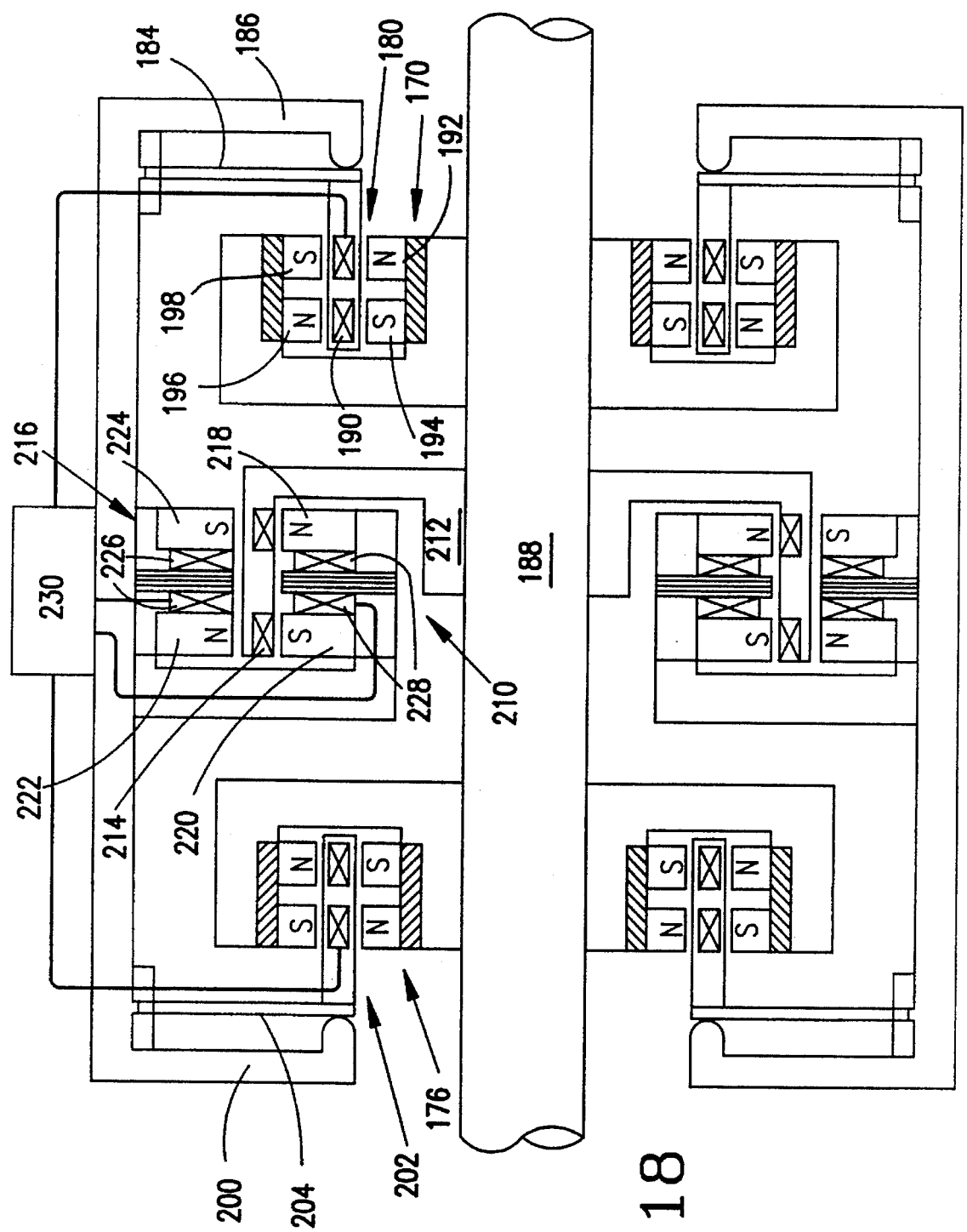
FIG. 18 is a cross-sectional view of a magnetic bearing system according to still another embodiment of the invention.

As mentioned before, a semiactive displacement-responsive generator can be substituted for the electromagnet attraction bearing, as is illustrated in FIG. 18. Like the previously discussed semiactive bearings, displacement-responsive generator 210 has a loop subassembly 212, which is axially fixed to the shaft 188, and which has a plurality of conductive loops 214.

It also has a stationary magnet subassembly 216, on which four rings 218, 220, 222 and 224 of permanent field magnets are mounted. Each magnet in the rings has two circumferentially spaced poles, and the magnets in each ring are arranged to provide a plurality of alternating radial magnetic fields between radially opposed magnets 218 and 224, and between 220 and 222. Further, magnets 218 and 224 are arranged so that their circumferentially alternating radial magnetic fields are opposite to the radial magnetic fields produced by the magnets 220 and 222. The semi-active displacement-responsive generator 210 also has a first ring 226 of controllable electromagnets between axially adjacent magnet rings 222 and 224, and a second ring 228 of controllable electromagnets between axially adjacent magnet rings 218 and 220, as is shown in FIG. 18.

As has been explained, when shaft 188 moves from its prescribed position to the right, displacement-responsive generator 170 produces a right current, which is transmitted to windings of one direction in the electromagnets 226 and 228. This causes the bearing 128 to produce Lorentz forces which return the shaft 188 to its prescribed position. Similarly, when shaft 188 moves from its prescribed position to the left, displacement-responsive generator 176 produces a left current, which is transmitted to oppositely wound windings of the electromagnets 226 and 228, causing the bearing 128 to produce Lorentz forces which again return the shaft 188 to its prescribed position.

From this description, however, it will be apparent that the nearly sinusoidal currents generated by the generators 170 and 176 should not be transmitted directly to the electromagnets 226 and 228. Instead, these right and left currents are first conditioned by a rectifying circuit 230. Rectifying circuit 230 can employ conventional circuits, such as a full wave bridge rectifier or a half wave rectifier, to rectify the nearly sinusoidal left and right currents. The rectified currents are then smoothed in conventional fashion with a smoothing capacitor in rectifying circuit 230 to produce nearly DC current.

We claim:

1. A magnetic bearing system, comprising, a stator assembly, a rotor assembly which is rotatable relative to said stator assembly, a magnetic bearing for supporting the rotor assembly at a prescribed position relative to the stator assembly, said magnetic bearing having a first rotor-positioning subassembly and a second rotor-positioning subassembly, said rotor-positioning subassemblies of said magnetic bearing being mounted on different said assemblies;

an electric generator for providing an output voltage which varies in response to deviations of the rotor assembly from its said prescribed position, said electric generator having a magnet subassembly and a loop subassembly, said magnet and loop subassemblies of said electric generator being mounted on different said assemblies;

said loop subassembly including a loop of electrically conductive material, said magnet subassembly of said electric generator including a plurality of field magnets which each produce at least one magnetic field, said stator assembly and said rotor assembly being relatively positioned and rotatable about an axis of rotation so that said loop follows a prescribed circular path relative to and through said magnetic fields produced by the field magnets, said magnetic fields produced by the field magnets being positioned (a) to subject the interior of said loop to magnetic flux to produce equal and opposed electromotive forces in said loop when said loop is on its prescribed circular path so that no net voltage is generated in said loop, and (b) to subject the interior of said loop to magnetic flux to produce unequal and opposed electromotive forces in said loop when said loop deviates from its prescribed circular path so that a net voltage is induced in said loop, said first rotor-positioning subassembly of the magnetic bearing having coils formed of electrical conductors, said loop of the electric generator being electrically connected to at least one of said coils whereby net voltages induced in said loop will drive currents to activate the magnetic bearing in a direction which moves said loop toward its prescribed path.

2. A magnetic bearing system according to claim 1 wherein said magnetic bearing utilizes magnetic attraction forces for positioning the rotor assembly relative to the stator assembly, said first rotor-positioning subassembly including first and second electromagnets, said second rotor-positioning subassembly including a body which is magnetically attractable by said electromagnets, said coils being electromagnet windings.

3. A magnetic bearing system according to claim 1 wherein said magnetic bearing utilizes Lorentz forces for positioning the rotor assembly relative to the stator assembly, said coils of said first rotor-positioning subassembly being a plurality of bearing loops, said second rotor-positioning subassembly having a plurality of bearing field magnets which each produce at least one magnetic field, said bearing loops moving along a prescribed circular path relative to and through said magnetic fields produced by said bearing field magnets.

4. A magnetic bearing system according to claim 1 wherein one of said magnet subassembly and said loop subassembly is a displaceable subassembly which is movably mounted on its respective assembly, said displaceable subassembly having a normal position which it occupies when said loop is traveling in its prescribed circular path, said displaceable subassembly being movable on its respective assembly in only one direction of movement from its normal position, said one direction being lateral with respect to said prescribed circular path.

5. A magnetic bearing system according to claim 4 wherein said magnetic bearing system includes two said electric generators which each have a said displaceable subassembly, said displaceable subassemblies having opposite said directions of movement.

6. A magnetic bearing system according to claim 4 wherein said displaceable subassembly is supported by a flexible member on one said assembly, and said one assembly includes a stop surface which obstructs movement of said displaceable subassembly in a direction which is opposite to said one direction.

7. A magnetic bearing system according to claim 6 wherein the flexible member is made of resilient sheet material.

8. A magnetic bearing system according to claim 4, further including a rectifier, wherein current is transmitted from said loop to said at least one coil through said rectifier.

9. A magnetic bearing system according to claim 1, further including
a signal generator for generating first electrical signals in synchronism with rotation of said rotor assembly, and
a first controller operable in response to said electrical signals for controlling the flow of current from said electric generator to said at least one coil of said first rotor-positioning subassembly of said magnetic bearing.

10. A magnetic bearing system according to claim 9, wherein said signal generator includes a magnet mount subassembly and a conductor subassembly, said subassemblies of said signal generator being mounted on different said assemblies.

11. A magnetic bearing system according to claim 10, wherein said magnet mount subassembly includes a plurality of magnetic poles equally spaced about its respective assembly in a circumferential direction.

12. A magnetic bearing system according to claim 11, wherein said loop subassembly includes a plurality of loops equally spaced about its respective assembly in a circumferential direction.

13. A magnetic bearing system according to claim 12, wherein a number of said plurality of said closed loops is twice a number of said plurality of magnetic poles.

14. A magnetic bearing system according to claim 9, wherein said coils include a first coil for activating said first assembly to apply force to said stator assembly from said rotor assembly in a first direction, and a second coil for activating said first assembly to apply force to said stator assembly from said rotor assembly in a second direction.

15. A magnetic bearing system according to claim 14, wherein said first controller includes a first rectifier and a second rectifier, whereby voltage is applied from said loop to said first coil through said first rectifier, and to said second coil through said second rectifier.

16. A magnetic bearing system according to claim 15, wherein said first rectifier is a controlled rectifier which is activated in response to said first electrical signals.

17. A magnetic bearing system according to claim 14, wherein said signal generator generates second electrical pulses which occur at different shaft angles from said first electrical signals.

18. A magnetic bearing system according to claim 17, wherein said signal generator produces second electrical signals which are 180 electrical degrees out of phase from said first electrical signals.

19. A magnetic bearing system according to claim 17, wherein said signal generator includes a magnet mount subassembly and a conductor subassembly, said subassemblies of said signal generator being mounted on different said assemblies.

20. A magnetic bearing system according to claim 19, wherein said magnet mount subassembly includes a plurality of magnetic poles equally spaced about its respective assembly in a radial direction.

21. A magnetic bearing system according to claim 19, wherein said conductor subassembly includes a first conductive winding and a second conductive winding, said second conductive winding being circumferentially displace on said conductor subassembly from said first conductive winding.

22. A magnetic bearing system according to claim 21, wherein said second conductive winding is circumferentially displaced 45° from said first conductive winding.

23. A magnetic bearing system according to claim 17, wherein said second rectifier is a controlled rectifier which is activated in response to said second electrical signals.

24. A magnetic bearing system according to claim 1, wherein
said electric generator further includes a position sensor for sensing a deviation of said rotor assembly from its prescribed position relative of said stator assembly relative to said rotor assembly, said magnet subassembly of said electric generator includes a plurality of electromagnets which each produce at least one magnetic field in response to said position sensor sensing a displacement of said rotor assembly from its prescribed position relative to said stator which deviates said loop from its prescribed path, said electromagnets being positioned such that said net magnetic fields produced by said electromagnets cooperate with said magnetic fields produced by said field magnets in subjecting the interior of said loop to magnetic flux to produce unequal and opposed electromotive forces in said loop when said loop deviates from its prescribed circular path so that an electrical current is induced in said loop.

25. A magnetic bearing system according to claim 1, wherein said electric generator provides an output voltage which varies linearly in response to deviations of said rotor assembly from its prescribed position relative to said stator assembly.

26. A magnetic bearing system according to claim 1, wherein said electric generator provides an alternating voltage output which has (a) a first phase when said rotor assembly deviates in a first direction from its prescribed position relative to said stator assembly direction, and (b) a second phase when said rotor assembly deviates in a second direction from its prescribed position, said second direction being opposite to said first direction, said first and second phases being shifted 180 electrical degrees relative to each other.

27. A magnetic bearing system, comprising, a stator assembly, a rotor assembly which is rotatable relative to said stator assembly, a magnetic bearing for supporting the rotor assembly at a prescribed position relative to the stator assembly, said magnetic bearing having a first rotor-positioning subassembly and a second rotor-positioning subassembly, said rotor-positioning subassemblies of said magnetic bearing being mounted on different said assemblies;

an electric generator for providing an output voltage which varies in response to deviations of the rotor assembly from its said prescribed position, said electric generator having a magnet subassembly and a loop subassembly, said subassemblies of said electric generator being mounted on different said assemblies;

said loop subassembly including a loop of electrically conductive material, said magnet subassembly of said electric generator including a plurality of field magnets which each produce at least one magnetic field, said stator assembly and said rotor assembly being relatively positioned and rotatable about an axis of rotation so that said loop follows a circular path relative to and through said magnetic fields produced by the field magnets, said magnetic fields produced by the field magnets being positioned to subject the loop to magnetic flux to produce opposed electromotive forces in said loop when said loop travels in its circular path relative to said magnetic fields, said opposed electromotive forces producing in said loop a voltage which varies in response to changes in the position of said loop relative to its prescribed position, said first rotor-positioning subassembly of the magnetic bearing having coils formed of electrical conductors, said loop of the electric generator being electrically connected to at least one of said coils whereby net voltages induced in said loop will drive currents to activate the magnetic bearing in a direction which moves said loop toward its prescribed path.

28. A magnetic bearing system according to claim 27 wherein said field magnets are positioned to produce equal opposed electromotive forces and a zero voltage in said loop when the rotor assembly is at said prescribed position.

29. A magnetic bearing system according to claim 27 wherein said loop is mounted on said stator assembly.

30. A magnetic bearing system according to claim 27 wherein said magnetic bearing utilizes magnetic attraction forces for positioning the rotor assembly relative to the stator assembly, said first rotor-positioning subassembly including first and second electromagnets, said second rotor-positioning subassembly including a body which is magnetically attractable by said electromagnets, said coils being electromagnet windings.

* * * * *